(12) United States Patent
Komamiya

(10) Patent No.: US 12,157,303 B2
(45) Date of Patent: Dec. 3, 2024

(54) IMAGE PROCESSING APPARATUS, PRINTING APPARATUS, IMAGE PROCESSING METHOD, AND STORAGE MEDIUM

(71) Applicant: CANON KABUSHIKI KAISHA, Tokyo (JP)

(72) Inventor: Eiji Komamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/155,774

(22) Filed: Jan. 18, 2023

(65) Prior Publication Data

US 2023/0234349 A1 Jul. 27, 2023

(30) Foreign Application Priority Data

Jan. 25, 2022 (JP) .................. 2022-009634

(51) Int. Cl.
*B41J 2/045* (2006.01)

(52) U.S. Cl.
CPC ....... *B41J 2/04505* (2013.01); *B41J 2/04586* (2013.01)

(58) Field of Classification Search
CPC .. B41J 2/04505; B41J 2/04586; B41J 2/2132; B41J 2/16508; B41J 25/3082; B41J 2/2139; B41J 2/2146; B41J 2/2142; B41J 2/04546; B41J 2/04545; B41J 2/04543; G06K 15/105; G06K 15/107
See application file for complete search history.

(56) References Cited

U.S. PATENT DOCUMENTS

| 8,622,501 | B2 | 1/2014 | Komamiya | |
|---|---|---|---|---|
| 10,974,505 | B2 | 4/2021 | Edamura | |
| 11,254,123 | B2 | 2/2022 | Kawatoko | |
| 2006/0187251 | A1* | 8/2006 | Pulver | B41J 2/04505 347/42 |
| 2011/0298853 | A1* | 12/2011 | Takamiya | B41J 2/2146 347/13 |

FOREIGN PATENT DOCUMENTS

| JP | 2004-122546 A | | 4/2004 | |
|---|---|---|---|---|
| JP | 20159542 | * | 9/2016 | B41J 2/01 |

* cited by examiner

*Primary Examiner* — Kristal Feggins
(74) *Attorney, Agent, or Firm* — Venable LLP

(57) ABSTRACT

Provided is a technique capable of obtaining a high-quality image without enhancing the arrangement accuracy of chips in a print head. In the print head, first and second chips respectively having first and second nozzle arrays are arranged. End regions of the first and second nozzle arrays form an overlapping portion (OL) where they overlap in view from a conveyance direction. An image processing apparatus allocates pieces of print data to the nozzles in the first and second nozzle arrays based on an inter-nozzle distance. At this time, the image processing apparatus performs a process of shifting allocation positions of the pieces of print data relative to the nozzles from the allocation positions in a state where the inter-nozzle distance is normal, and changes a distribution process of distributing the pieces of print data to the nozzles in the overlapping portion, according to the inter-nozzle distance.

14 Claims, 13 Drawing Sheets

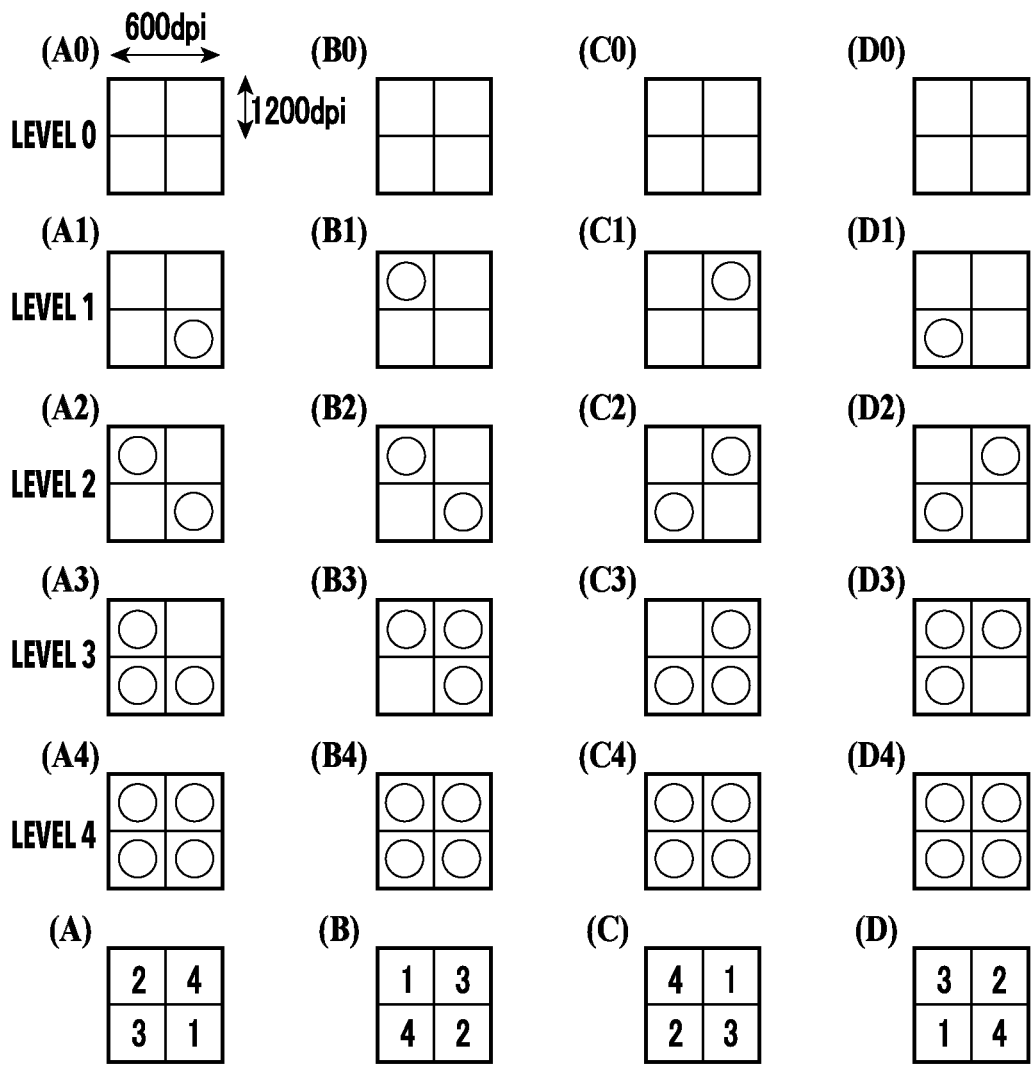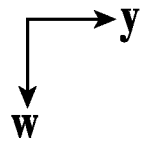
FIG.7

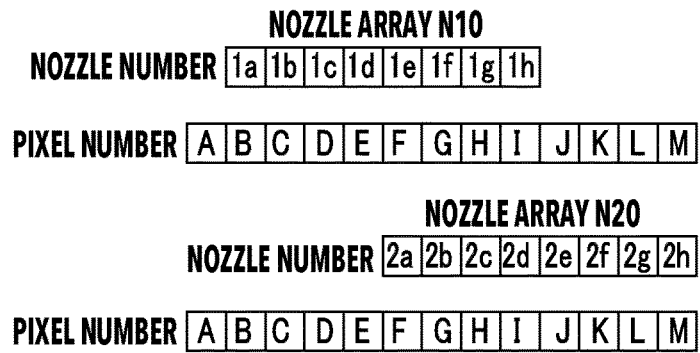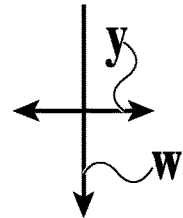
FIG.10A
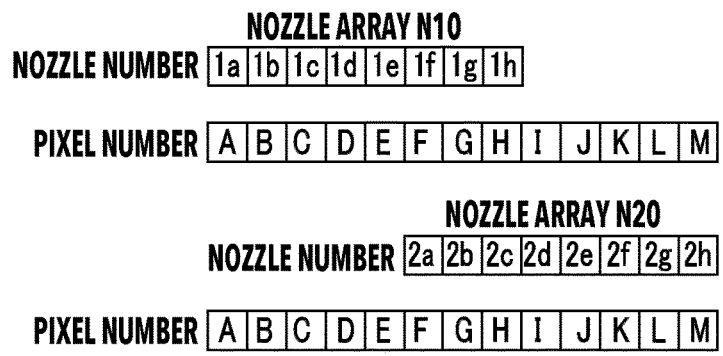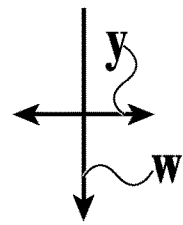
FIG.10B
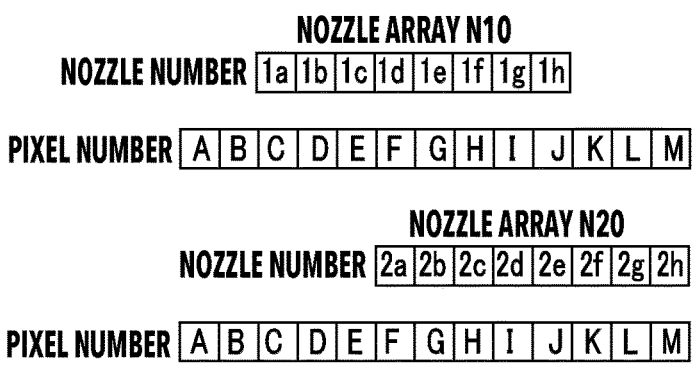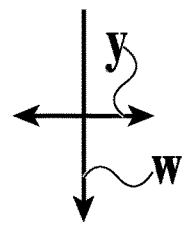
FIG.10C

FIG. 13

IMAGE PROCESSING APPARATUS, PRINTING APPARATUS, IMAGE PROCESSING METHOD, AND STORAGE MEDIUM

BACKGROUND OF THE INVENTION

Field of the Invention

The present invention relates to a printing apparatus that performs a printing operation with a print head in which a plurality of chips are arrayed, as well as an image processing apparatus, image processing method, and storage medium to be used in the printing operation.

Description of the Related Art

In recent years, inkjet-type printing apparatuses including what is called a connected head have been known. In the connected head, a plurality of chips having nozzle arrays that eject inks are arranged in a predetermined direction. The plurality of chips provided in the connected head are usually arranged such that nozzle arrays in adjacent chips partly overlap each other. The nozzle intervals in this overlapping portion OL of the nozzle arrays may vary due to an error in the arrangement of the adjacent chips or the like. As a result, the printing positions of dots to be formed on a print medium may be misaligned from each other. In this case, density unevenness appears in the form of a stripe in the portion printed by the overlapping portion OL. This deteriorates the image quality. Chips are therefore desired to be mounted with high accuracy, but doing so requires a high-accuracy manufacturing apparatus, etc. and is thus extremely costly. Given such circumstances, there has been a demand for a technique capable of preventing the deterioration in the image quality at the overlapping portion OL without having to enhance the mounting accuracy of the chips.

Japanese Patent Laid-Open No. 2004-122546 discloses a technique for reducing the visibility of a stripe-shaped density defect at a joining portion of heads. Specifically, the technique involves: detecting the interval between the heads by analyzing a pattern printed by the joining portion; and correcting input image signals yet to be input into printing elements according to the detected interval.

However, a problem with the above technique of Japanese Patent Laid-Open No. 2004-122546 is that image data to be printed by the joining portion cannot be appropriately corrected in a case where the adjacent chips are misaligned by a distance greater than or equal to the resolution of their nozzles (arrangement interval between the nozzles). For example, in a case where the chips are misaligned in a direction in which the arrangement interval therebetween widens, only end nozzles in either a first or second nozzle array located in the overlapping portion OL are used to print dots. Consequently, an unprinted stripe may appear. In a case where the chips are misaligned in a direction in which the arrangement interval therebetween narrows, some of the end nozzles in the first or second nozzle array in the overlapping portion OL may apply the ink to a region of the print medium to which the ink is to be applied from another nozzle. Consequently, an overprinted stripe may appear.

SUMMARY OF THE INVENTION

In view of the above problem, an object of the present invention is to provide a technique capable of obtaining a high-quality image even in a case where adjacent chips are misaligned by a distance greater than or equal to the resolution of their nozzles.

Further features of the present invention will become apparent from the following description of exemplary embodiments with reference to the attached drawings.

BRIEF DESCRIPTION OF THE DRAWINGS

FIG. 7 is a diagram illustrating index patterns;

FIGS. 10A to 10C are diagrams illustrating relationships between pixel numbers and nozzle numbers of nozzles;

FIG. 13 is a diagram illustrating mask sets corresponding to mask ranks.

DESCRIPTION OF THE EMBODIMENTS

First Embodiment

Figure 1:
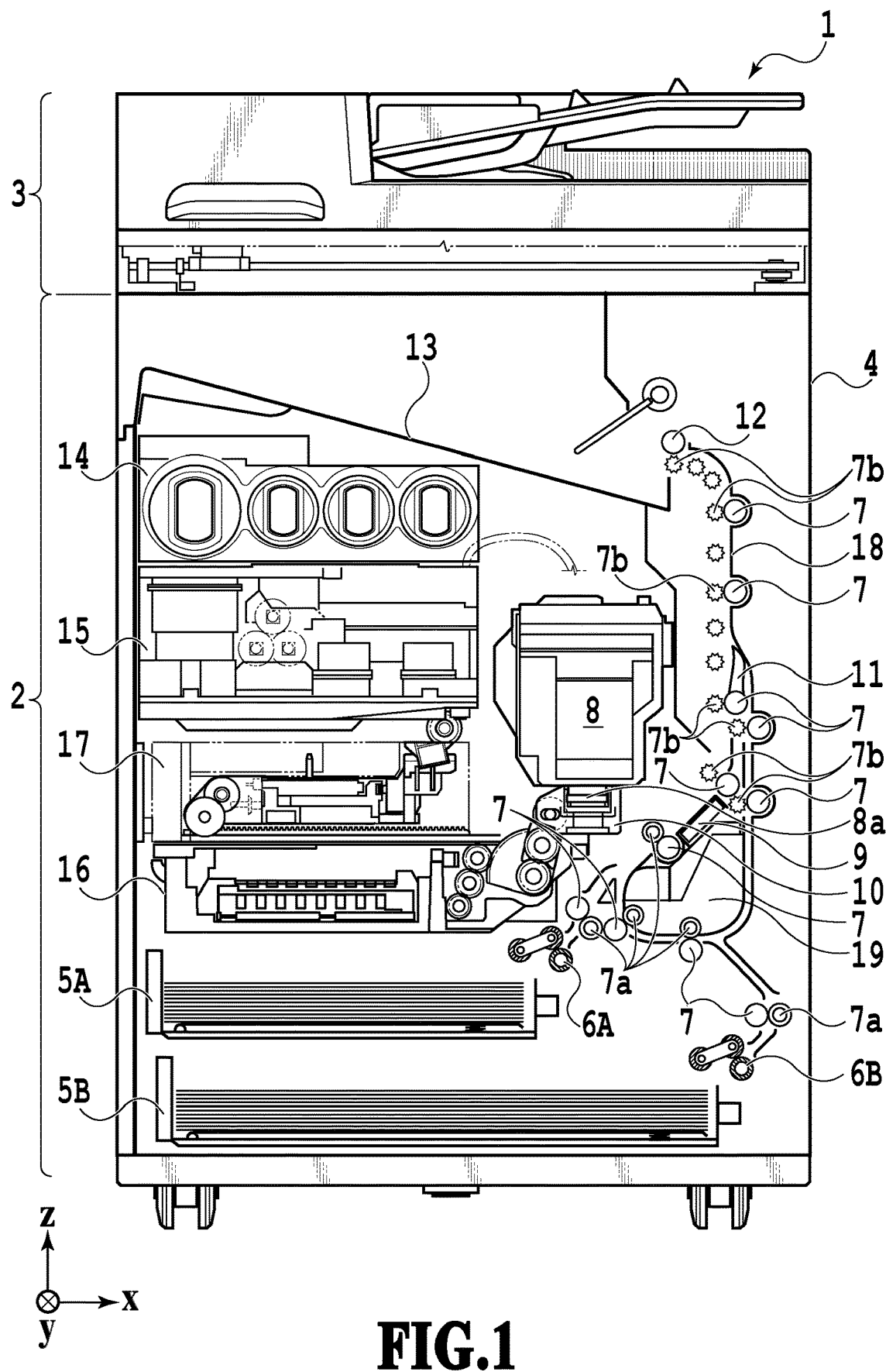
FIG. 1 is a diagram of an internal configuration of a printing apparatus.

FIG. 1 is a diagram of an internal configuration of an inkjet printing apparatus 1 used in the present embodiment (hereinafter "printing apparatus 1"). In drawings, the x direction represents a horizontal direction, the y direction (the direction perpendicular to the sheet surface) represents the direction in which nozzles that ejects inks are arrayed in a later-described print head 8, and the z direction represents a vertical direction.

The printing apparatus 1 is a multi-function peripheral including a printing section 2 and a scanner section 3, and is capable of executing various processes related to a printing operation and a reading operation by using the printing section 2 and the scanner section 3 individually or together. The scanner section 3 includes an automatic document feeder (ADF) and a flatbed scanner (FBS), and is capable of reading (scanning) a document automatically fed by the ADF and reading (scanning) a document placed on the FBS' platen glass by the user. In the present embodiment, the printing apparatus 1 is a multi-function peripheral including both the printing section 2 and the scanner section 3, but may not include the scanner section 3. FIG. 1 illustrates the printing apparatus 1 in a standby state where it is performing neither a printing operation nor a reading operation.

In the printing section 2, a first cassette 5A and second cassette 5B that accommodate print media (cut sheets) S are detachably arranged in a bottom portion of a housing 4 on a vertically lower side. The first cassette 5A accommodates a flat pile of relatively small print media of up to A4 size. The second cassette 5B accommodates a flat pile of relatively large print media of up to A3 size. Near the first cassette 5A, there is provided a first feed unit 6A which separates the accommodated print media and feeds them one by one. Similarly, a second feed unit 6B is provided near the second cassette 5B. In a case of performing a printing operation, a print medium S is fed selectively from one of the cassettes.

Conveyance rollers 7, a discharge roller 12, pinch rollers 7a, spur rollers 7b, a guide 18, an inner guide 19, and a flapper 11 are conveyance mechanisms that guide a print medium S in a predetermined direction. The conveyance rollers 7 are drive rollers which are arranged upstream and downstream of the print head 8 and driven by a conveyance motor not illustrated. The pinch rollers 7a are each a driven roller which rotates while nipping a print medium S with one of the conveyance rollers 7. The discharge roller 12 is a drive roller which is arranged downstream of the conveyance rollers 7 and driven by a conveyance motor not illustrated. The spur rollers 7b nip and convey a print medium S with the conveyance rollers 7 arranged downstream of the print head 8 and the discharge roller 12.

The guide 18 is provided along a conveyance path for a print medium S and guides the print medium S in a predetermined direction. The inner guide 19 is a member extending in the y direction. It has a curved side surface and guides a print medium S along this side surface. The flapper 11 is a member which switches the direction of conveyance of a print medium S in a double-sided printing operation. A discharge tray 13 is a tray on which to stack and hold print media S having completed a printing operation and discharged by the discharge roller 12.

The print head 8 is a full-line type print head, and a plurality of nozzles that eject inks according to print data are arrayed along the y direction in FIG. 1 over a distance corresponding to the width of a print medium S.

Figure 2A:
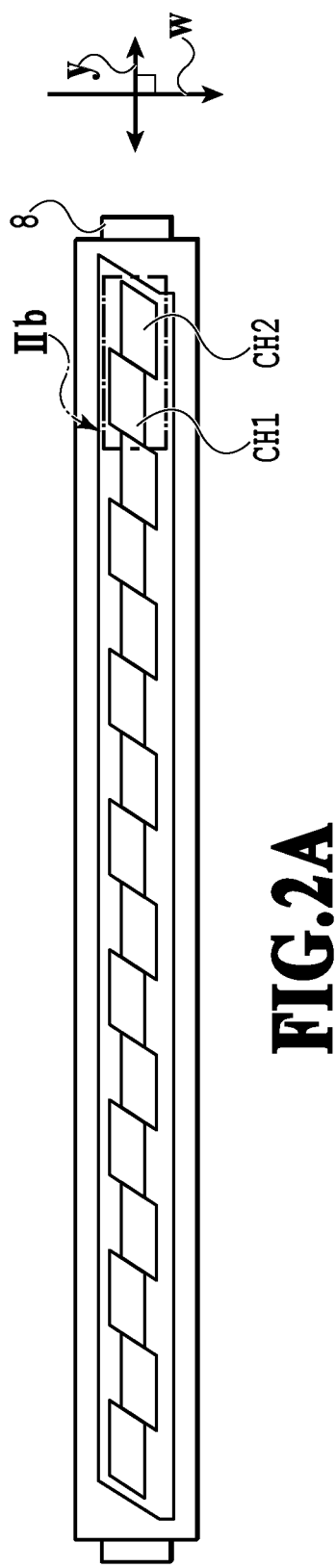
FIGS. 2A and 2B are diagrams illustrating a configuration of a print head.

Now, a configuration of the print head 8 used in the present embodiment will be described with reference to FIGS. 2A and 2B. FIG. 2A is a diagram illustrating the print head 8 used in the present embodiment. The print head 8 employs the configuration of what is called a connected print head in which a plurality of parallelogrammatic chips CH having nozzle arrays arranged along the y direction are arrayed along a direction orthogonal to the conveyance direction of a print medium S (w direction). Each chip has the same configuration. In the present embodiment, a staggered arrangement is employed in which adjacent chips CH are arranged at positions shifted from each other by a predetermined distance in the y direction.

Figure 2B:
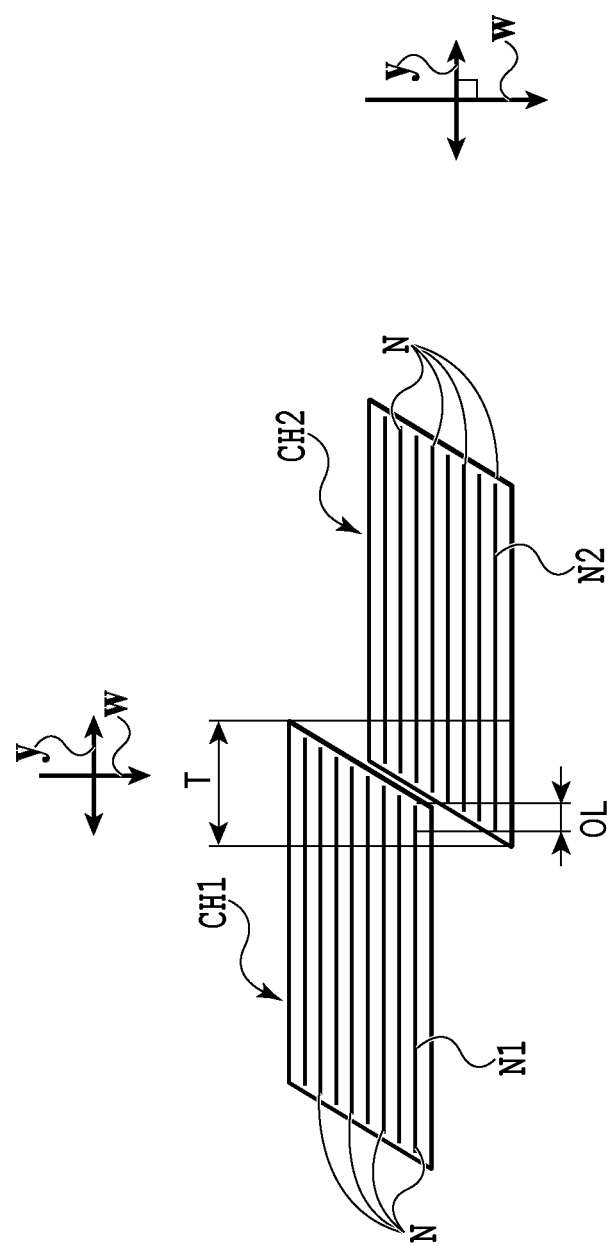

FIG. 2B is an enlarged view of a region IIb illustrated in FIG. 2A, and illustrates chips CH1 and CH2 adjacent to each other. As illustrated in FIG. 2B, a plurality of nozzle arrays are arranged in parallel to one another in each of the chips CH1 and CH2, and each nozzle array corresponds to one of a plurality of ink colors. In this example, each nozzle array corresponds to one of inks of four colors cyan (C), magenta (M), yellow (Y), and black (K).

The chips CH1 and CH2 are arranged so as to form a joining portion T where they overlap each other as viewed in the conveyance direction of a print medium S (w direction). Moreover, nozzle arrays among nozzle arrays N in the chips CH1 and CH2 which eject the same ink have an overlapping portion OL including nozzles located at the same position in the y direction. For example, a nozzle array N1 provided in the chip CH1 and a nozzle array N2 provided in the chip CH2 have an overlapping portion OL including nozzles present at the same positions in the y direction. This overlapping portion OL can be seen as a portion including nozzles of both nozzle arrays N1 and N2 that overlap each other in a view of the nozzle arrays N1 and N2 from the conveyance direction w of a print medium.

As described above, in the present embodiment, each chip CH is arranged such that nozzle arrays in adjacent chips have an overlapping portion OL where the nozzle arrays overlap each other in a view from the w direction. Thus, even in a case where a chip CH is misaligned from a predetermined position, density unevenness such as an overprinted stripe or an unprinted stripe can be prevented from appearing in a printed image by controlling the driving (ink ejection) of the nozzles in the overlapping portion OL by characteristic processes of the present embodiment to be described later.

Now, refer back to FIG. 1. In a case where the print head 8 configured as described above is in a standby position, a surface 8a of the print head 8 where the nozzles are formed (nozzle surface) is oriented vertically downward and capped with a cap unit 10, as illustrated in FIG. 1. In a case of performing a printing operation, a later-described print controller 202 changes the orientation of the print head 8 such that the nozzle surface 8a faces a platen 9. The platen 9 includes a flat plate extending in the y direction, and supports a print medium S to be subjected to the printing operation by the print head 8 from the back surface. Movement of the print head 8 from the standby position to a printing position will be described later in detail.

An ink tank unit 14 stores the inks of the four colors to be supplied to the print head 8. An ink supply unit 15 is provided at an intermediate portion of a channel connecting the ink tank unit 14 and the print head 8, and adjusts the pressures and flow rates of the inks in the print head 8 within appropriate ranges. In the present embodiment, a circulation-type ink supply system is employed. The ink supply unit 15 adjusts the pressures of the inks to be supplied to the print head 8 and the flow rates of the inks to be collected from the print head 8 within appropriate ranges.

A maintenance unit 16 includes the cap unit 10 and a wiping unit 17, and actuates them at a predetermined timing to perform a maintenance operation on the print head 8.

Figure 3:
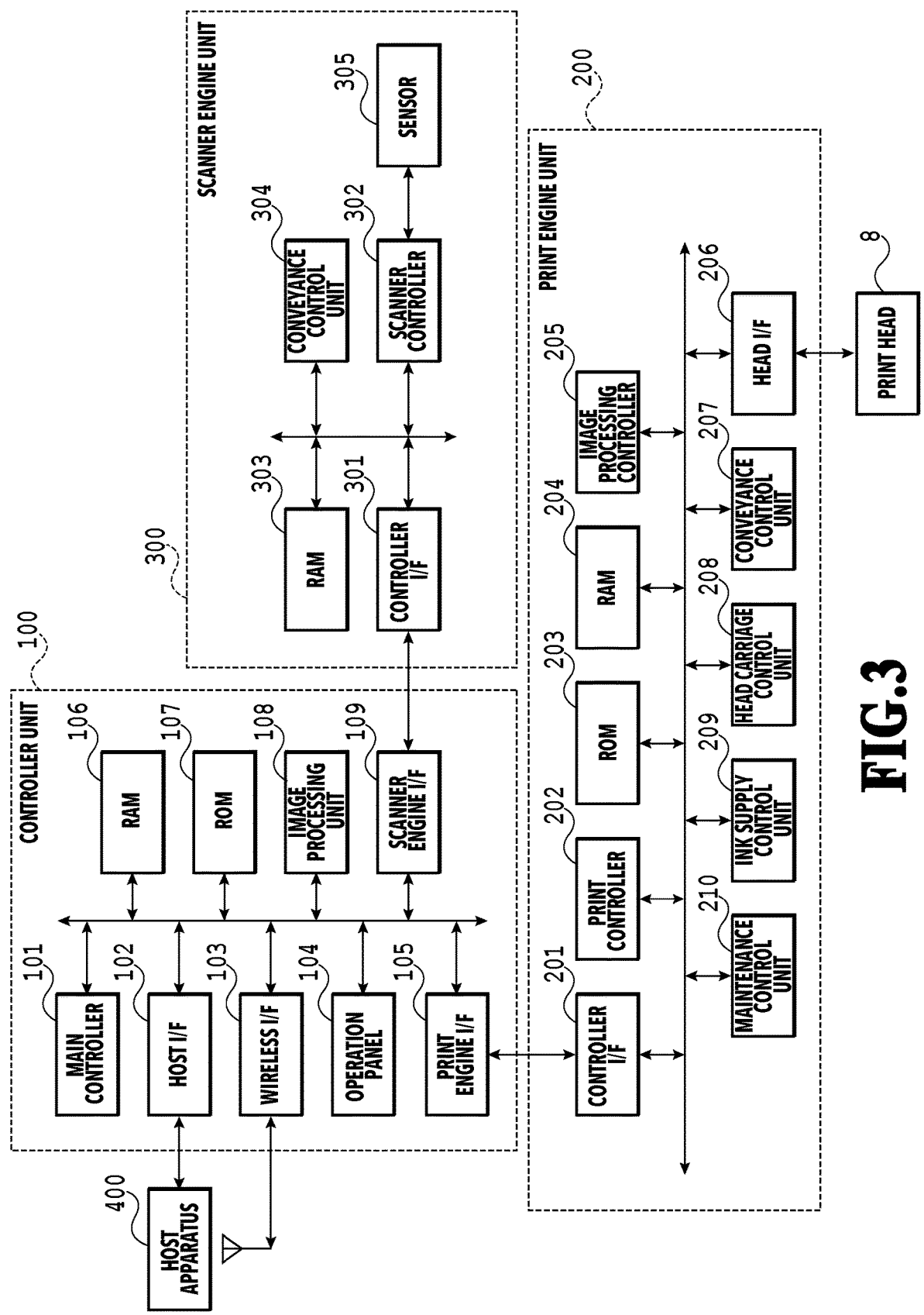
FIG. 3 is a diagram of a control configuration of the printing apparatus.

FIG. 3 is a block diagram illustrating a control configuration in the printing apparatus 1. The control configuration mainly includes a print engine unit 200 that comprehensively controls the printing section 2, a scanner engine unit 300 that comprehensively controls the scanner section 3, and a controller unit 100 that comprehensively controls the entire printing apparatus 1. The controller unit functions as an image processing apparatus that performs image processing to be described later. The print controller 202 controls various mechanisms of the print engine unit 200 by following instructions from a main controller 101 of the controller unit 100. The main controller 101 of the controller unit 100 controls various mechanisms of the scanner engine unit 300. Details of the control configuration will now be described.

In the controller unit 100, the main controller 101, which is a CPU, controls the entire printing apparatus 1 according to a program and various parameters stored in a ROM 107 with a RAM 106 as a work area. For example, in a case where a print job is input from a host apparatus 400 via a host I/F 102 or a wireless I/F 103, an image processing unit 108 serving as an image processing unit performs predetermined image processing on received input image data by following an instruction from the main controller 101. The main controller 101 then sends the image data (print data)

subjected to the image processing to the print engine unit 200 via a print engine I/F 105.

The printing apparatus 1 may obtain image data from the host apparatus 400 by wireless or wired communication or from an external storage (such as a USB memory) connected to the printing apparatus 1. The communication method for the wireless or wired communication is not limited. For example, Wireless Fidelity (Wi-Fi) (registered trademark) or Bluetooth (registered trademark) is usable as a communication method for the wireless communication. Universal Serial Bus (USB) or the like is usable as a communication method for the wired communication. Also, in a case where, for example, a read command is input from the host apparatus 400, the main controller 101 sends this command to the scanner section 3 via a scanner engine I/F 109.

An operation panel 104 is a mechanism for the user to entering and receiving information to and from the printing apparatus 1. Via the operation panel 104, the user can issue an instruction to perform an operation such as copying or scanning, set a print mode, and recognize information from the printing apparatus 1.

In the print engine unit 200, the print controller 202, which is a CPU, controls various mechanisms included in the printing section 2 according to a program and various parameters stored in a ROM 203 with a RAM 204 as a work area. In a case where various commands and image data are received via a controller I/F 201, the print controller 202 temporarily saves these in the RAM 204. The print controller 202 causes an image processing controller 205 to convert the saved image data into print data so that the print head 8 can use the image data in a printing operation. After the print data is generated, the print controller 202 causes the print head 8 to execute a printing operation based on the print data via a head I/F 206. At this time, the print controller 202 drives the feed unit 6A or 6B, the conveyance rollers 7, the discharge roller 12, and the flapper 11 illustrated in FIG. 1 via a conveyance control unit 207 to convey a print medium S. Following an instruction from the print controller 202, the print head 8 executes the printing operation in conjunction with the operation of conveying the print medium S to perform print processing.

A head carriage control unit 208 changes the orientation and position of the print head 8 according to the operating status of the printing apparatus 1 such as whether the printing apparatus 1 is in a maintenance state or in a printing state. An ink supply control unit 209 controls the ink supply unit 15 such that the pressures of the inks to be supplied to the print head 8 stay within appropriate ranges. A maintenance control unit 210 controls the operation of the cap unit 10 and the wiping unit 17 in the maintenance unit 16 in a case of performing a maintenance operation on the print head 8.

For the scanner engine unit 300, the main controller 101 controls hardware resources of a scanner controller 302 according to a program and various parameters stored in the ROM 107 with the RAM 106 as a work area. This is how various mechanisms included in the scanner section 3 are controlled. For example, the main controller 101 controls hardware resources in the scanner controller 302 via a controller OF 301 to convey a document loaded on the ADF by the user via a conveyance control unit 304 and read the document with a sensor 305. The scanner controller 302 then saves the read image data to a RAM 303. The print controller 202 can convert the image data thus obtained into print data and cause the print head 8 to execute a printing operation based on the image data read by the scanner controller 302.

Figure 4:
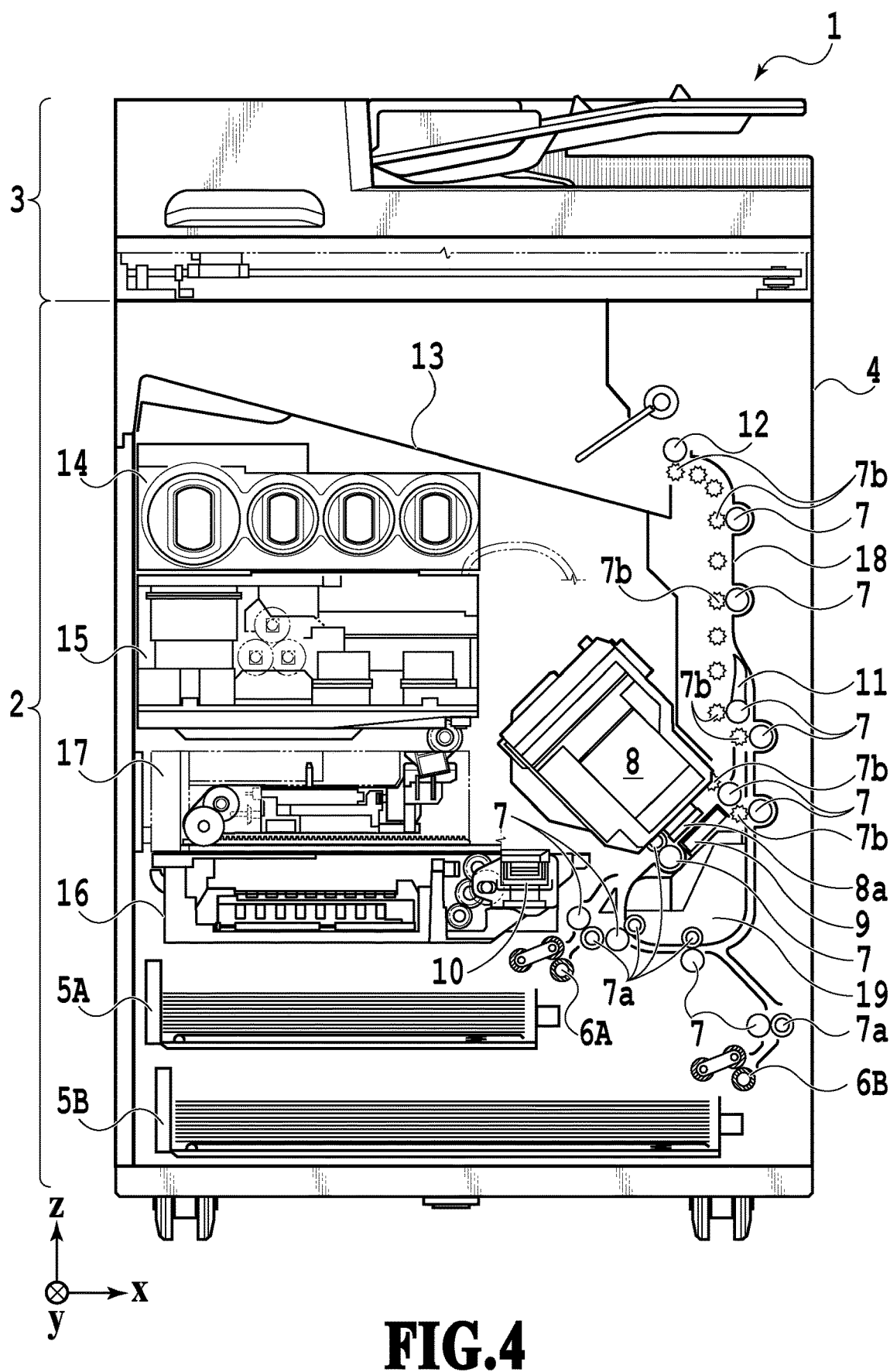
FIG. 4 is a diagram of the printing apparatus in a printing state.

FIG. 4 illustrates the printing apparatus 1 in a printing state. Unlike the standby state illustrated in FIG. 1, the cap unit 10 is separated from the nozzle surface 8a of the print head 8, and the nozzle surface 8a is facing the platen 9. In the present embodiment, the planar surface of the platen 9 is inclined at approximately 45 degrees to the horizontal direction, and the nozzle surface 8a of the print head 8 in the printing position is also inclined at approximately 45 degrees to the horizontal direction to maintain a constant distance between itself and the platen 9.

To move the print head 8 from the standby position illustrated in FIG. 1 to the printing position illustrated in FIG. 4, the print controller 202 uses the maintenance control unit 210 to lower the cap unit 10 to the retracted position illustrated in FIG. 1. As a result, the nozzle surface 8a of the print head 8 gets separated from the cap unit 10. The print controller 202 then uses the head carriage control unit 208 to rotate the print head 8 by 45 degrees while adjusting its height in the vertical direction to thereby make the nozzle surface 8a face the platen 9. The print controller 202 performs the opposite process to the above in a case of moving the print head 8 from the printing position to the standby position after completing the printing operation.

Next, conveyance paths for a print medium S in the printing section 2 will be described. In a case where a print command is input, the print controller 202 firstly uses the maintenance control unit 210 and the head carriage control unit 208 to move the print head 8 to the printing position illustrated in FIG. 4. The print controller 202 then uses the conveyance control unit 207 to drive the first feed unit 6A or the second feed unit 6B according to the print command to feed a print medium S.

Figure 5C:
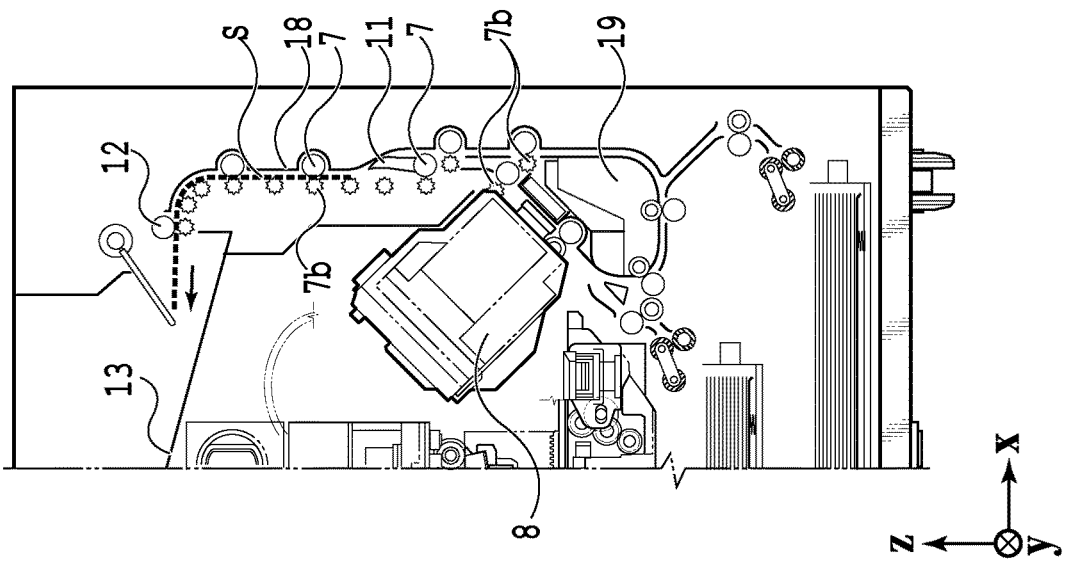
FIGS. 5A to 5C are diagrams illustrating a conveyance path for a print medium fed from a first cassette.
Figure 5B:
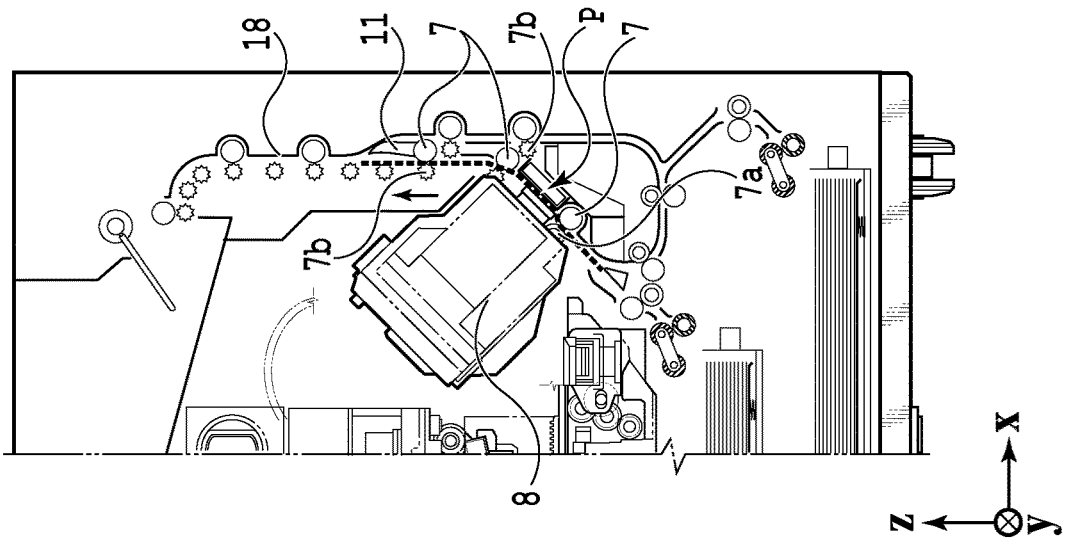
Figure 5A:
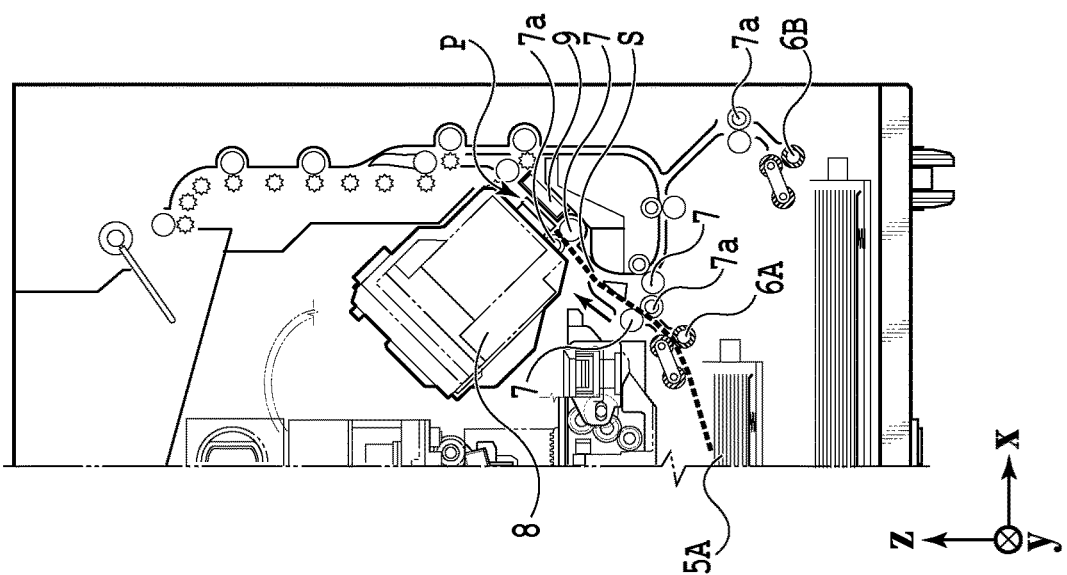

FIGS. 5A to 5C are diagrams illustrating a conveyance path for feeding an A4 print medium S accommodated in the first cassette 5A. The top print medium S loaded in the first cassette 5A is separated from the second and lower print media by the first feed unit 6A and conveyed toward a printing region P between the platen 9 and the print head 8 while being nipped by the corresponding conveyance roller 7 and pinch roller 7a. FIG. 5A illustrates a conveyance state immediately before the leading edge of the print medium S reaches the printing region P. The traveling direction of the print medium S changes from the horizontal direction (x direction) to a direction inclined by approximately 45 degrees to the horizontal direction as the print medium S is fed by the first feed unit 6A and moves to the printing region P.

At the printing region P, the inks are ejected onto the print medium S from the plurality of nozzles provided in the print head 8. The platen 9 supports the back surface of the region of the print medium S where the inks are applied, so that a constant distance is maintained between the nozzle surface 8a and the print medium S. The print medium S after the ink application is guided by some conveyance rollers 7 and spur rollers 7b to pass by the left side of the flapper 11 with the tip inclined rightward and be conveyed along the guide 18 toward a vertically upper side in the printing apparatus 1. FIG. 5B illustrates a state where the leading edge of the print medium S has passed the printing region P and is being conveyed toward the vertically upper side. The traveling direction of the print medium S has been changed by the conveyance rollers 7 and the spur rollers 7b to the vertically upward direction from the position of the printing region P, which is inclined by approximately 45 degrees to the horizontal direction.

After being conveyed to the vertically upper side, the print medium S is discharged onto the discharge tray 13 by the discharge roller 12 and some spur rollers 7*b*. FIG. 5C illustrates a state where the leading edge of the print medium S has passed the discharge roller 12 and the print medium S is about to be discharged onto the discharge tray 13. The print medium S thus discharged is held on the discharge tray 13 with the surface on which an image was printed by the print head 8 facing down.

Similarly, an A3 print medium S accommodated in the second cassette 5B is conveyed toward the printing region P between the platen 9 and the print head 8. Specifically, the top print medium S loaded in the second cassette 5B is separated from the second and lower print media by the second feed unit 6B and conveyed toward the printing region P between the platen 9 and the print head 8 while being nipped by the corresponding conveyance roller 7 and pinch roller 7*a*.

In a case of performing double-sided printing on an A4 print medium S, a first surface (front surface) is printed, and then a printing operation is performed on a second surface (back surface). The conveyance process in the printing of the first surface is similar to FIGS. 5A to 5C, and description thereof is therefore omitted below. After the print head 8 completes the printing operation of the first surface and the trailing edge of the print medium S passes the flapper 11, the print controller 202 rotates the conveyance rollers 7 in the reverse direction to convey the print medium S toward the inner side of the printing apparatus 1. At this time, an actuator not illustrated controls the flapper 11 so as to incline its tip leftward. Hence, the leading edge of the print medium S (the trailing edge during the printing operation of the first surface) passes by the right side of the flapper 11 and is conveyed vertically downward.

The print medium S is then conveyed along the curved outer peripheral surface of the inner guide 19 and conveyed to the printing region P between the print head 8 and the platen 9 again. At this time, the second surface of the print medium S faces the nozzle surface 8*a* of the print head 8. The conveyance path after this is the same as that in the printing of the first surface illustrated in FIGS. 5B and 5C. When the leading edge of the print medium S passes the printing region P and is conveyed vertically upward, the actuator not illustrated controls the flapper 11 so as to move it to the position at which its tip is inclined rightward.

Figure 6:
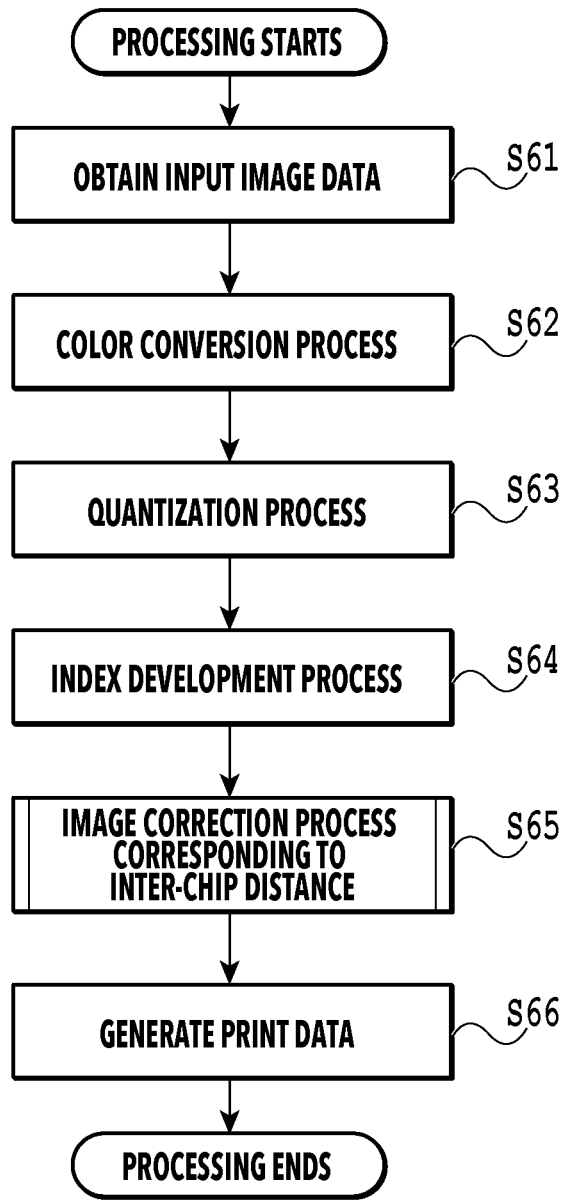
FIG. 6 is a flowchart of data processing by a control program.
Figure 9:
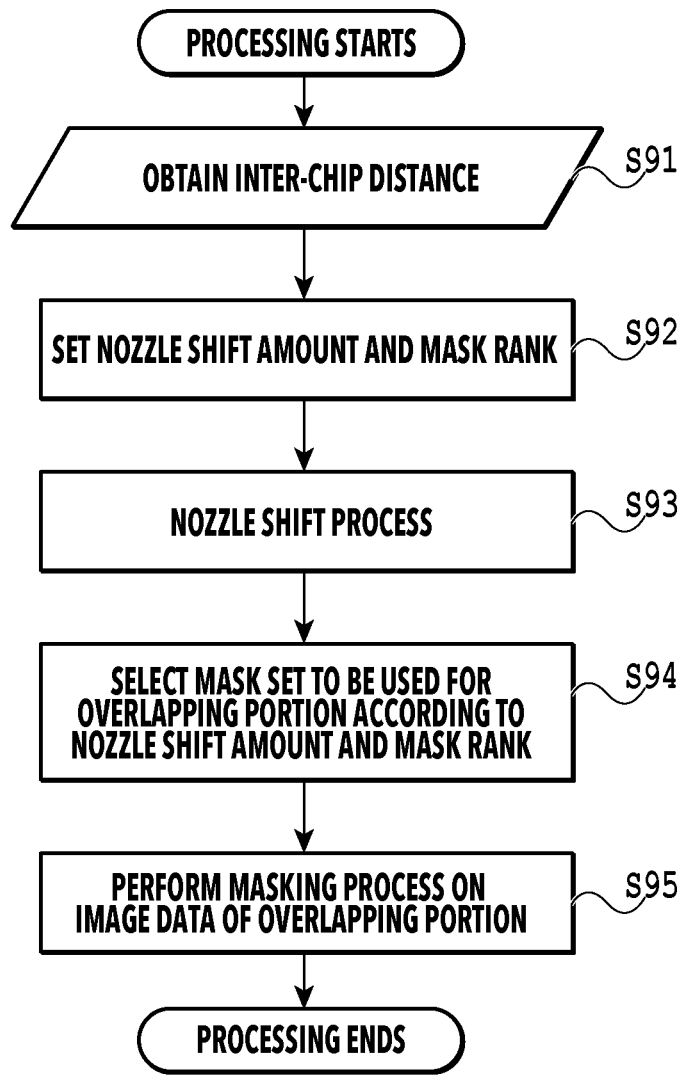
FIG. 9 is a flowchart illustrating image processing corresponding to an inter-chip distance.

FIG. 6 is a flowchart of data processing by a control program in the present embodiment. The processing illustrating in FIG. 6 and the processing illustrated in FIG. 9 are executed by the image processing unit 108 of the controller unit 100 illustrated in FIG. 3 according to instructions from the main controller 101. The image processing unit 108 therefore functions as the image processing unit, obtaining units, allocation unit, and control unit described in the claims. Note that "S" attached to each step number in the flowcharts illustrated in FIGS. 6 and 9 means a step.

In S61, the controller unit 100 receives multivalued input image data (RGB data) including 8-bit information for each of red (R), green (G), and blue (B) from the host apparatus 400 via the host I/F 102 or the wireless I/F 103. In the present embodiment, the input image data has a data resolution of 600 dpi×600 dpi. Each pixel of the input image data in a data resolution of 600 dpi×600 dpi indicates a value within a range of 0 to 255. The main controller 101 transfers the received image data to the image processing unit 108. The image processing unit 108 then executes processes of S62 to S66 in turn.

In S62, the image processing unit 108 executes a color conversion process of converting the image data into ink color data corresponding to the colors of the inks to be used in the printing. In the present embodiment, inks of four colors C (cyan), M (magenta), Y (yellow), and K (black) are used, and the color conversion process generates ink color data having 8-bit information for each of C, M, Y, and K (CMYK data). Each pixel of the ink color data in a resolution of 600 dpi×600 dpi indicates one of 256 values (integers) from 0 to 255.

Then, in S63, the image processing unit 108 quantizes each piece of ink color data to generate tone data including 3-bit information for each of C, M, Y, and K. A dithering method, an error diffusion method, or the like can be employed as this quantization process. In the present embodiment, the quantization process generates tone data having a data resolution of 600 dpi×600 dpi. Each pixel of the tone data in a data resolution of 600 dpi×600 dpi indicates one of five values from level 0 to level 4 (five-level tone values).

Then, in S64, the image processing unit 108 performs an index development process on the tone data to generate binary data including 1-bit information for each of C, M, Y, and K. The binary data generated by the index development process has a data resolution of 1200 dpi×1200 dpi. Each pixel of this binary data in a resolution of 1200 dpi×1200 dpi indicates whether to eject or not to eject the ink. The binary data will also be referred to as "print data" below.

In the present embodiment, the index development process in S64 uses different index patterns for different tone values in the tone data. Here, an index pattern refers to a pattern defining the number and positions of pixels in which to eject the ink according to a tone value (level), as illustrated in FIG. 7. Details of these index patterns and the index development process in S64 will be described later.

Then, in S65, the main controller 101 obtains information indicating the amount of deviation from the appropriate distance between end nozzles in each pair of adjacent chips at their overlapping portion OL in the print head (hereinafter referred to as "inter-chip distance"). This information indicating the inter-chip distance is prestored in the RAM 106, which is a storage unit, for each overlapping portion OL. The main controller 101 reads out the inter-chip distance at each overlapping portion OL stored in the RAM 106. Then, based on the information indicating the inter-chip distance read out of the RAM 106, the main controller 101 then performs image processing on the print data corresponding to the inter-chip distance, and sends the print data thus processed to the print engine unit 200.

Note that each inter-chip distance stored in the RAM 106 can be specified by various conventionally known methods. For example, the inter-chip distance can be obtained (calculated) by printing a test chart with the printing apparatus and performing an analysis process on print data generated by scanning that test chart with the scanner section 3. Alternatively, the information on each inter-chip distance can be measured in the process of manufacturing the print head, and the measured information can be stored in a predetermined storage medium provided in the main body of the print head.

Thereafter, in S66, pieces of print data to be allocated to the nozzles of each chip are generated based on the print data after the image processing sent from the controller unit 100 in S65. Details of the image processing corresponding to the inter-chip distance in S65 and the print data generation process in S66 will be described later.

After the above processes, the print controller 202 drives the print head 8 based on the generated binary print data to execute a printing operation on a print medium.

In the configuration described above, the data processing of S61 to S66 is executed. However, other processing may be executed as long as it can generate data that defines whether or not to eject the ink for each nozzle. For example, the received image data may be converted into data with a resolution of 1200 dpi×1200 dpi, and binary data (print data) may be generated from it by dithering.

(Index Development Process)

Details of the index development process executed in the present embodiment will be described.

FIG. 7 is a diagram schematically illustrating index patterns used in the index development process in the present embodiment. In the present embodiment, four index patterns are provided each defining the number and positions of pixels in which to eject an ink according to the tone value of a piece of tone data in a data resolution of 600 dpi×600 dpi, i.e., a pixel group of 2 pixels×2 pixels. These index patterns are selected and used according to the positions of pixel groups.

(A) to (D) in FIG. 7 are diagrams describing the four index patterns used in the present embodiment. The number inside each pixel represents a threshold value for determining whether or not to eject the ink by comparing with the tone value of the piece of tone data. Specifically, in a case where the tone value is more than or equal to the threshold value in a pixel, the ink is set to be ejected to that pixel. In a case where the tone value is less than the threshold value, the ink is set not to be ejected to that pixel.

For example, in the index pattern illustrated in (A) (hereinafter referred to as "index pattern A"), threshold values "1", "2", "3", and "4" are set in the lower right, upper left, lower left, and upper right pixels, respectively.

Then, in a case where a piece of tone data with a tone value of level 0 is input, the ink is set not to be ejected to any of the 2 pixel×2 pixel in the pixel group (A0). In a case where a piece of tone data with a tone value of level 1 is input, the ink is set to be ejected only to the lower right pixel, in which threshold value "1" is set (A1). In a case where a piece of tone data with a tone value of level 2 is input, the ink is set to be ejected to the lower right pixel, in which threshold value "1" is set, and also the upper left pixel, in which threshold value "2" is set (A2). In a case where a piece of tone data with a tone value of level 3 is input, the ink is set to be ejected to the lower right and upper left pixels, in which threshold values "1" and "2" are set, and also the lower left pixel, in which threshold value "3" is set (A3). In a case where a piece of tone data with a tone value of level 4 is input, the ink is set to be ejected to all of the 2 pixel×2 pixel in the pixel group (A4).

The above similarly applies to the index patterns illustrated in (B), (C), and (D) in FIG. 7 (hereinafter referred to as "index pattern B", "index pattern C", and "index pattern D", respectively).

For example, in a case of using the index pattern B, the ink is set not to be ejected to any of the pixels with level 0 (B0). The ink is set to be ejected to only the upper left pixel with level 1 (B1), to the upper left and lower right pixels with level 2 (B2), and to the upper left, lower right, and upper right pixels with level 3 (B3). The ink is set to be ejected to all pixels with level 4 (B4).

In a case of using the index pattern C, the ink is set not to be ejected to any of the pixels with level 0 (C0). The ink is set to be ejected to only the upper right pixel with level 1 (C1), to the upper right and lower left pixels with level 2 (C2), and to the upper right, lower left, and lower right pixels with level 3 (C3). The ink is set to be ejected to all pixels with level 4 (C4).

In a case of using the index pattern D, the ink is set not to be ejected to any of the pixels with level 0 (D0). The ink is set to be ejected to only the lower left pixel with level 1 (D1), to the lower left and upper right pixels with level 2 (D2), and to the lower left, upper right, and upper left pixels with level 3 (D3). The ink is set to be ejected to all pixels with level 4 (D4).

In the present embodiment, the above index patterns A to D are arranged based on a predetermined arrangement pattern, and the tone data is subjected to index development with the index patterns thus arranged to generate binary data (print data).

(Arrangements of Nozzle Arrays in Chips and their Nozzles)

Figure 8A:
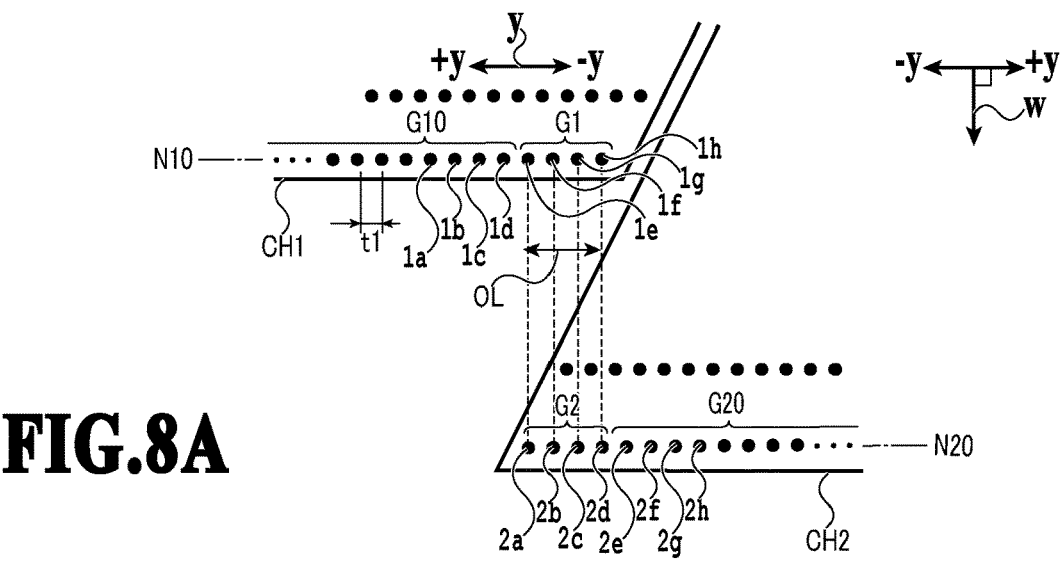
FIGS. 8A to 8C are schematic diagrams illustrating example arrangements of nozzle arrays in each chip and their nozzles.
Figure 8B:
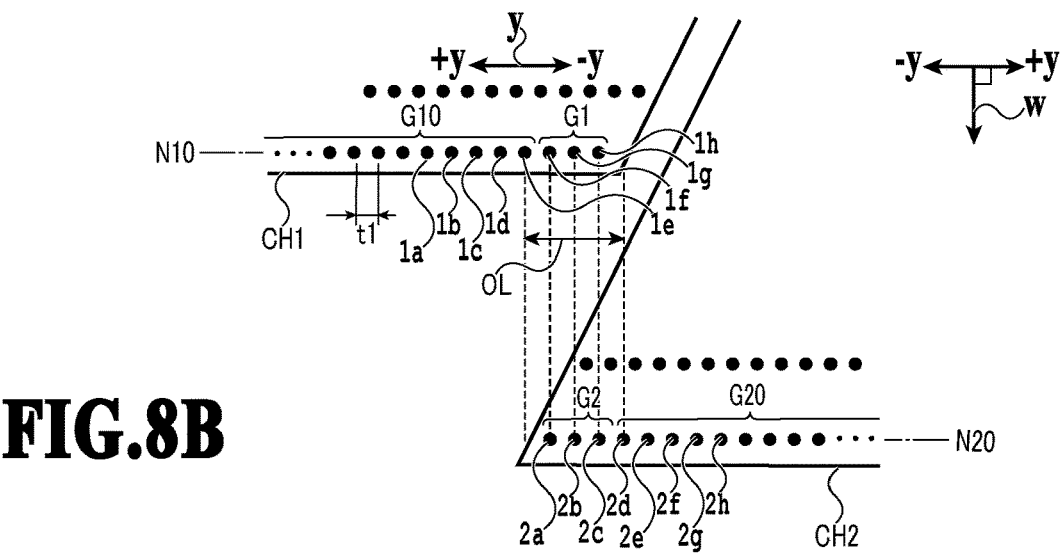
Figure 8C:
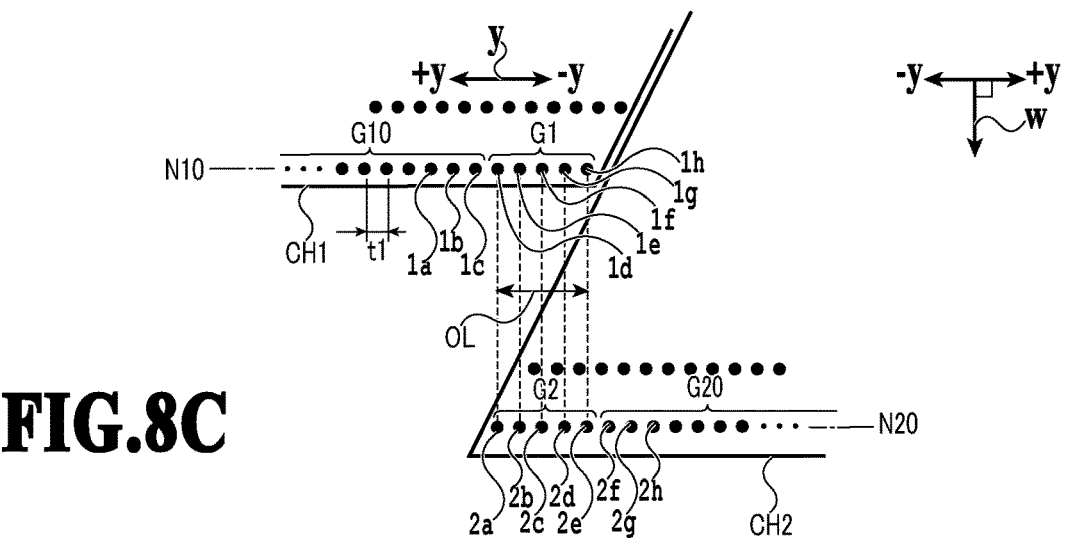

FIGS. 8A to 8C are diagrams specifically illustrating example arrangements of nozzle arrays in each chip and their nozzles in the print head 8 used in the present embodiment. FIGS. 8A to 8C are enlarged views of part of the joining portion T of the chip CH1 (first chip) and the chip CH2 (second chip) illustrated in FIG. 2 mentioned earlier.

In the present embodiment, each chip CH provided in the print head 8 has the same configuration. Thus, in the chips CH1 and CH2, nozzle arrays that eject inks of the same colors are arranged along a predetermined arrangement direction. In the present embodiment, the arrangement direction of the chips CH1 and CH2 is the y direction. A nozzle array N10 (first nozzle array) in the chip CH1 and a nozzle array N20 (second nozzle array) in the chip CH2 are nozzle arrays that eject an ink of the same color. As illustrated in FIGS. 8A to 8C, the nozzle arrays N10 and N20 are arranged at different positions in the conveyance direction of a print medium S (w direction), but the first and second nozzle arrays N10 and N20 are nozzle arrays responsible for forming a single line extending in the w direction. Specifically, the nozzle arrays N10 and N20 are driven at different timings based on the difference between their arrangement positions in the w direction (first direction) to shoot ink droplets at the same position on a print medium S in the y direction. In this way, a single continuous line can be formed.

Each nozzle array provided in each chip includes a plurality of nozzles arrayed at predetermined nozzle intervals t1 along a nozzle array direction (y direction) which is a second direction crossing the conveyance direction of a print medium (w direction), which is a first direction. In this example, the nozzle array direction (y direction) is set to be a direction orthogonal to the conveyance direction (w direction). In each nozzle array N, the distance (nozzle interval) t1 between adjacent nozzles in the y direction is 1200 dpi.

(Inter-Chip Distance)

Next, the distance between adjacent chips in the print head 8 (inter-chip distance) will be described with reference to FIGS. 8A to 8C. FIG. 8A illustrates a state where the chips CH1 and CH2 in the print head 8 are arranged in an appropriate positional relationship. A plurality of end nozzles 1e, 1f, 1g, and 1h in the nozzle array N10 located on an end side thereof (first end nozzle) and a plurality of end nozzles 2a, 2b, 2c, and 2d in the nozzle array N20 located on an end side thereof (second end nozzle) overlap each other in the y direction, respectively. Specifically, the nozzles 1e and 2a, the nozzles 1f and 2b, the nozzles 1g and 2c, and the nozzles 1h and 2d are each arranged on the same straight line parallel to the w direction. The nozzles located at the overlapping portion OL where two adjacent nozzle arrays overlap each other in the y direction will be referred to as "overlapping nozzles", and the nozzle group including the overlapping nozzles will be referred to as "overlapping nozzle group". In the example illustrated in FIG. 8A, the end nozzles 1e, 1f, 1g, and 1h in the first nozzle array N10 are overlapping nozzles, and these overlapping nozzles form an overlapping nozzle group G1. Similarly, in the second nozzle array N20, the end nozzles 2a, 2b, 2c, and 2d are overlapping nozzles, and these overlapping nozzles form an overlapping nozzle group G2. In the present embodiment, a state where the chips CH1 and CH2 are arranged so as to obtain the nozzle arrangement illustrated in FIG. 8A is the ideal chip arrangement, and the inter-chip distance in this chip arrangement is "0". On the other hand, in a case where at least one of the chips CH1 and CH2 is misaligned in the y direction from the ideal arrangement, the inter-chip distance takes a value other than "0".

In the present embodiment, the inter-chip distance is defined as the average value of the inter-nozzle distances between the overlapping nozzles 1e and 2a, 1f and 2b, 1g and 2c, and 1h and 2d measured by a measurement unit not illustrated. An inter-nozzle distance refers to the distance between a corresponding pair of overlapping nozzles (e.g., the overlapping nozzles 1e and 2a) in the y direction, and the inter-nozzle distance is 0 in a state where the chips CH1 and CH2 are arranged appropriately. That is, an inter-nozzle distance other than 0 represents an amount of misalignment between the pair of overlapping nozzles in the y direction. The inter-nozzle distance is therefore equivalent to the distance in the y direction between the positions of the pixels in an image to be formed on a print medium S and the positions of the nozzles responsible for forming the pixels. The inter-chip distance calculated based on such inter-nozzle distances assumes the following. Specifically, the direction in which the first and second nozzle arrays N10 and N20 get farther away from each other, i.e., the direction in which the chips CH1 and CH2 get farther away from each other, is "+(plus) direction". Moreover, the direction in which the first and second nozzle arrays N10 and N20 get closer to each other, i.e., the direction in which the chips CH1 and CH2 get closer to each other, is "−(minus) direction". Note that the inter-nozzle distance and inter-chip distances are stored in the RAM 106 serving as a first storage unit.

FIG. 8B illustrates a state where the inter-chip distance has deviated in the plus direction. In this state, the dot density in a region to be printed by the end nozzles (1e to 1h and 2a to 2d) tends to be locally low, and an unprinted stripe may appear. FIG. 8C illustrates a state where the inter-chip distance has deviated in the − direction. In this state, the dot density in a region to be printed by the overlapping nozzles tends to be locally high, and an overprinted stripe may appear. To address this, in the present embodiment, the following image correction process is executed according to the inter-chip distance.

(Image Correction Process Corresponding to Inter-Chip Distance)

FIG. 9 is a flowchart illustrating image processing corresponding to the inter-chip distance which is executed in the present embodiment. The processes illustrated in this flowchart are executed by the image processing unit 108 functioning as an image processing unit according to instructions from the main controller 101. Note that the processes to be described below correspond to the process executed in S65 illustrated in FIG. 6.

In S91, each inter-chip distance prestored in the RAM 106 of the controller unit 100 is obtained. Then, in S92, a process of setting a nozzle shift amount and a mask rank according to the inter-chip distance obtained in S91 is performed. A nozzle shift refers to moving the position of nozzles in the y direction relative to print data, and a nozzle shift amount refers to the amount of that movement. The mask rank will be described later.

Now, the relationship between the inter-chip distance and image quality will be described. Table 1 is a table made by printing a predetermined image on sheets of plain paper as print media S with the inter-chip distance varied at 5-μm intervals from "−30 (μm)" to "+30 (μm)" and organizing the relationship between the visibility of density unevenness (stripe) appearing in the image and the inter-chip distance. In Table 1, the state without a visible stripe represents a state without an image quality defect.

In Table 1, column A indicates values of the inter-chip distance, and column B indicates evaluation results of the stripe visibility. In a case where the inter-chip distance was "0", the nozzles of the chips were not misaligned from the ideal arrangement, and therefore no stripe was visually observed in the image. In a case where the inter-chip distance was "+5" or "−5", the adjacent chips were misaligned from each other but only to such an extent that no stripe was visually observed in the printed sample. Note that the visibility of a stripe varies depending on the type of the print medium S, the dot diameter of ink droplets, the wetting and spreading of the ink on the print medium, and so on. Under the conditions of this verification test, image defects such as stripes were not visually observed with an inter-chip distance of +5 or −5, i.e., an inter-chip distance of about ¼ pixel.

However, with an inter-chip distance of +10, i.e., an inter-chip distance of about ½ pixel, a minor unprinted stripe was visually observed. Moreover, with inter-chip distances of +15, +20, +25, and +30, i.e., inter-chip distances of more than ½ pixel, a major unprinted stripe was visually observed. On the other hand, with an inter-chip distance of −10, a minor overprinted stripe was visually observed. Moreover, with inter-chip distances of −15, −20, −25, and −30, a major overprinted stripe was visually observed.

In the present embodiment, in order to reduce such visually recognizable stripes, a nozzle shift process of shifting the nozzles to which pieces of pixel data are to be allocated from the default nozzles is performed.

TABLE 1

Relationships between Inter-chip Distances and Stripe Visibility in Overlapping Portion

| A (Inter-chip Distance (μm)) | B (Stripe Visibility) | C (Nozzle Shift Amount (Pixel)) |
|---|---|---|
| +30 | An unprinted stripe was visible | −1 |
| +25 | An unprinted stripe was visible | −1 |
| +20 | An unprinted stripe was visible | −1 |
| +15 | An unprinted stripe was visible | −1 |
| +10 | A minor unprinted stripe was visible | 0 |
| +5 | No visible stripe | 0 |
| 0 | No visible stripe | 0 |
| −5 | No visible stripe | 0 |
| −10 | A minor overprinted stripe was visible | 0 |
| −15 | An overprinted stripe was visible | +1 |
| −20 | An overprinted stripe was visible | +1 |
| −25 | An overprinted stripe was visible | +1 |
| −30 | An overprinted stripe was visible | +1 |

Column C in Table 1 indicates nozzle shift amounts in the nozzle shift process. Each nozzle shift amount listed in column C represents a nozzle shift amount based on the above-mentioned test result by which to shift the positions of the nozzles to be used in such a direction as to reduce the stripe visibility.

With inter-chip distances of −5, 0, and +5, there will be no visible image defect. Thus, the nozzle shift amount is set at 0, and the nozzle shift process will not be performed. With an inter-chip distance of +10, there will be a minor visible unprinted stripe. Here, a nozzle shift can be performed only in units of one pixel, i.e., approximately 20 µm. For this reason, performing the nozzle shift process will turn the inter-chip distance to −10, which will conversely make an equivalent overprinted stripe. Similarly, with an inter-chip distance of −10, performing the nozzle shift process in the +direction will turn the inter-chip distance to +10, which will conversely make an equivalent unprinted stripe. Thus, for such inter-chip distances that a nozzle shift is not expected to remedy the stripe, the nozzle shift amount is set at 0, and the nozzle shift process will not be performed. As described above, the nozzle shift process may not be able to improve the image quality in a case where the amount of misalignment is less than or equal to 20 which is the minimum correction accuracy of a nozzle shift. To address this, in the present embodiment, a process of setting mask data and selecting masks is performed according to the nozzle shift amount and mask rank set in S92.

With inter-chip distances of +15, +20, +25, and +30, there will be a major visible unprinted stripe. Thus, the nozzle shift amount is set at "−1". In this way, the apparent inter-chip distances can be values obtained by subtracting 20 from the actual inter-chip distances, i.e., −5, 0, +5, and +10, respectively. This brings the inter-chip distances within such a range that there will be no visible stripe or some minor visible unprinted stripe, as illustrated in Table 1. With inter-chip distances of −15, −20, −25, and −30, there will be a major visible overprinted stripe. Thus, the nozzle shift amount is set at "+1". In this way, the apparent inter-chip distances can be values obtained by adding 20 to the actual inter-chip distances, i.e., +5, 0, −5, and −10, respectively. This brings the inter-chip distances within such a range that there will be no visible stripe or some minor visible overprinted stripe, as illustrated in Table 1.

Next, in S93 illustrated in FIG. 9, the nozzle shift process (allocation process) is performed according to the nozzle shift amount set in S92 described above to determine the nozzle positions (allocation positions) in each nozzle array to which to allocate pieces of print data. The nozzle shift process for print data will now be described with reference to FIGS. 8A to 8C and FIGS. 10A to 10C. FIGS. 10A to 10C are diagrams illustrating relationships between pixel numbers representing the positions of a plurality of pieces of pixel data in image data and nozzle numbers given to nozzles.

As described earlier, in the case where the inter-chip distance is "0", the nozzle arrays N10 and N20 are arranged relative to each other as illustrated in FIG. 8A. In this case, the nozzles 1e and 2a, 1f and 2b, 1g and 2c, and 1h and 2d are each arranged on the same line parallel to the conveyance direction of a print medium (w direction). This nozzle arrangement illustrated in FIG. 8A is the ideal nozzle arrangement, and the nozzle shift amount in this state is "0".

FIG. 10A illustrates the relationship between the nozzle numbers and the pixel numbers representing the positions of the pieces of pixel data in the case where the nozzle shift amount is "0". In FIG. 10A, 1a to 1h are nozzle numbers in the nozzle array N10, and 2a to 2h are nozzle numbers in the nozzle array N20. Of these nozzles, the nozzles 1e to 1h in the nozzle array N10 and the nozzles 2a to 2d in the nozzle array N20 are the overlapping nozzles in these nozzle arrays. Moreover, in FIG. 10A, pixel numbers A to M are given representing pixel positions in an image region to be formed on a print medium S. The pieces of print data (pixel data) corresponding to these pixel numbers are allocated to nozzles as follows. Specifically, the piece of print data with the pixel number B is allocated to the nozzle 1a in the nozzle array N10, and the pieces of print data with the pixel numbers C, D, E, F, G, H, and I are allocated to the nozzles 1b to 1h, respectively. Also, the piece of print data (pixel data) with the pixel number F is allocated to the nozzle 2a in the nozzle array N20, and the pieces of print data with the pixel numbers G, H, I, J, K, L, and M are allocated to the nozzles 2b to 2h, respectively. Thus, for example, the piece of print data with the pixel number E will be printed by the nozzle 1d. The piece of print data with the pixel number F will be printed by the nozzle 1e or 2a, and the piece of print data with the pixel number I will be printed by the nozzle 1h or 2d. The piece of print data with the pixel number J will be printed by the nozzle 2e.

FIG. 8B illustrates the arrangement of the nozzle arrays N10 and N20 relative to each other in the case where the inter-chip distance is "+20". In this case, the nozzles 1f and 2a, 1g and 2b, and 1h and 2c are each arranged on the same line parallel to the conveyance direction of a print medium (w direction). Moreover, neither the nozzle 1e nor 2d has a nozzle located at the same position in the y direction. In the case where the inter-chip distance is "+20" as above, the nozzle shift amount is set at "−1" based on Table 1.

FIG. 10B illustrates the relationship between the nozzle numbers and the pixel numbers in the case of the nozzle arrangement in FIG. 8B. With the nozzle arrangement in FIG. 8B, the nozzle shift amount is set at "−1", as mentioned above. Accordingly, the number of overlapping nozzles is smaller than that in FIG. 10A by one nozzle. The piece of print data corresponding to the image with the pixel number A is allocated to the nozzle 1a in the nozzle array N10, and the pieces of print data with the pixel numbers B, C, D, E, F, G, and H are allocated to the nozzle 1b to 1h, respectively. Also, the piece of print data with the pixel number F is allocated to the nozzle 2a in the nozzle array N20, and the pieces of print data with the pixel numbers G, H, I, J, K, L, and M are allocated to the nozzles 2b to 2h, respectively. Thus, the piece of print data with the pixel number E undergoes a data shift so as to be printed by the nozzle 1e. The piece of print data with the pixel number F undergoes a data shift so as to be printed by the nozzle 1f or 2a. The piece of print data with the pixel number I undergoes a data shift so as to be printed by the nozzle 2d.

FIG. 8C illustrates the arrangement of the nozzle arrays N10 and N20 relative to each other in the case where the inter-chip distance is "−20". In this case, the nozzles 1e and 2b, 1f and 2c, and 1g and 2d are each arranged on the same line parallel to the conveyance direction of a print medium (w direction). Also, the nozzles 1h and 2a are arranged on the same lines parallel to the conveyance direction (w direction) with the non-overlapping nozzles 2e and 1d, respectively. In the case where the inter-chip distance is "−20" as above, the nozzle shift amount is set at "+1" based on Table 1.

FIG. 10C illustrates the relationship between the nozzle numbers and the pixel numbers in the case of the nozzle arrangement in FIG. 8C. With the nozzle arrangement in FIG. 8C, the nozzle shift amount is set at "+1", as mentioned above. Accordingly, the number of overlapping nozzles is larger than that in FIG. 10A by one nozzle. The piece of print data corresponding to the image with the pixel number C is allocated to the nozzle 1a in the nozzle array N10, and the pieces of print data with the pixel numbers D, E, F, G, H, I, and J are allocated to the nozzle 1b to 1h, respectively. Also, the piece of print data (pixel data) with the pixel number F is allocated to the nozzle 2a in the nozzle array N20, and the pieces of print data with the pixel numbers G, H, I, J, K, L, and M are allocated to the nozzles 2b to 2h, respectively. Thus, the piece of print data with the pixel number E undergoes a data shift so as to be printed by the nozzle 1c. The piece of print data with the pixel number F undergoes a data shift so as to be printed by the nozzle 1d or 2a. The piece of print data with the pixel number I undergoes a data shift so as to be printed by the nozzle 1g or 2d.

Next, the process of S94 illustrated in FIG. 9 is performed. In S94, a process of selecting masks according to the inter-chip distance obtained in S91 is performed. In the present embodiment, a process of distributing pieces of print data to the overlapping nozzles in the nozzle arrays N10 and N20 with masks is performed. Specifically, a process of distributing the pieces of print data in the overlapping portion to the overlapping nozzles 1e, 1f, 1g, and 1h in the nozzle array N10 and the overlapping nozzles 2a, 2b, 2c, and 2d in the nozzle array N20 is performed using masks corresponding to the overlapping nozzles.

Figure 11:
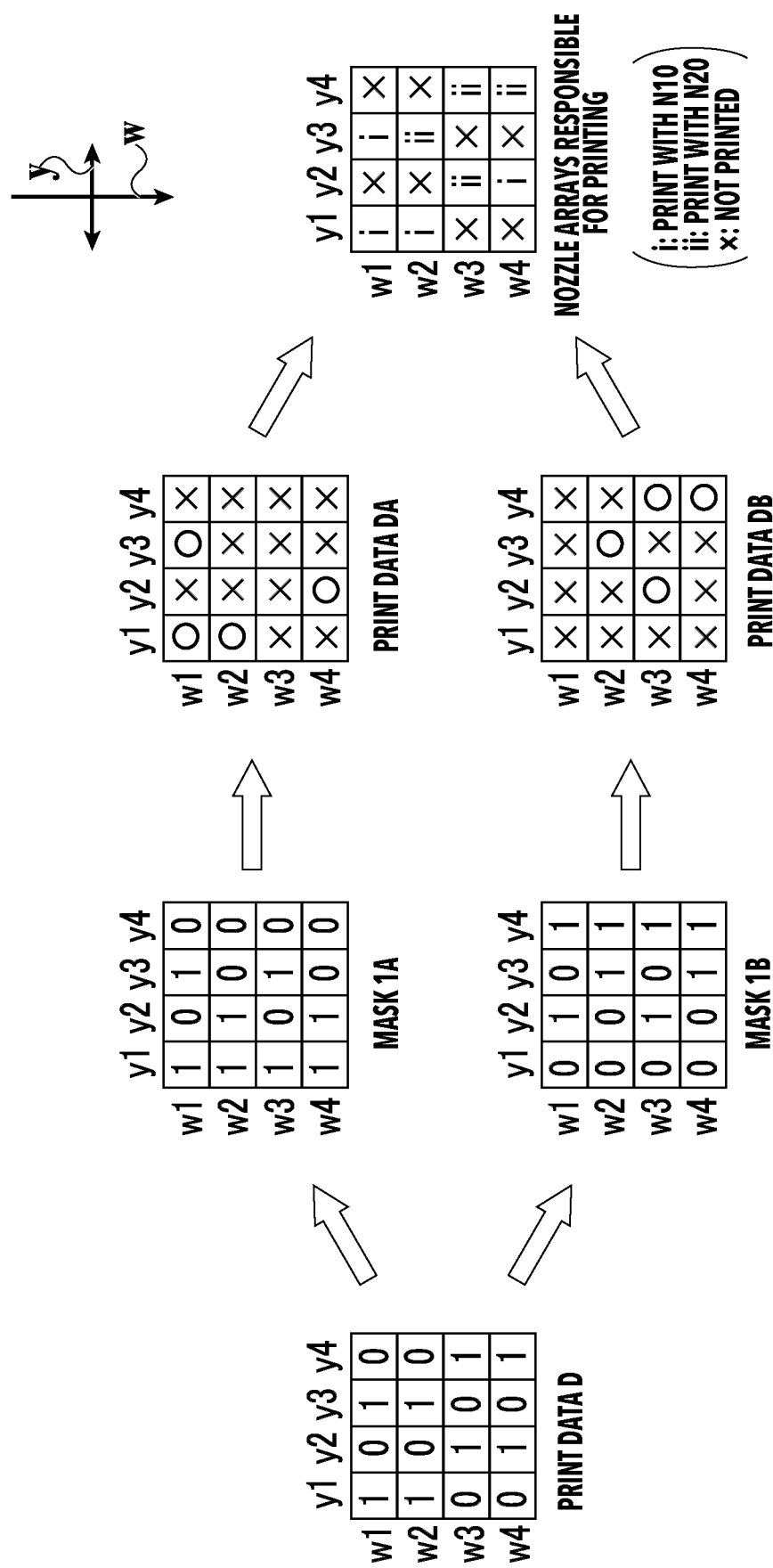
FIG. 11 is a diagram illustrating image data, masks, pieces of print data, and responsible nozzle arrays.

Now, the masks used in the present embodiment will be described with reference to the schematic diagram of FIG. 11. The masks include pieces of mask data for distributing print data to overlapping nozzles in a nozzle array provided in one of two adjacent chips (first overlapping nozzles) and to overlapping nozzles in the other chip (second overlapping nozzles). In FIG. 11, print data D represents print data of an image to be printed by the first and second overlapping nozzles, a mask 1A represents a mask for the first overlapping nozzles, and a mask 1B represents a mask for the second overlapping nozzles.

In the print data D and the masks 1A and 1B, the four pixels in the y direction (nozzle array direction) are given address numbers y1 to y4, and the four pixels in the w direction (conveyance direction) are given address numbers w1 to w4. As illustrated in FIG. 11, the print data and each mask have regions defined by the y direction (nozzle array direction) and the w direction (conveyance direction of a print medium). Of the 16 pieces of print data (pixel data) in the print data D defined by the y and w directions, each piece of data marked "1" represents a piece of data designating ink ejection (hereinafter referred to also as "ejection data"). On the other hand, each piece of pixel data marked "0" represents a piece of data not designating ink ejection (hereinafter referred to also as "non-ejection data"). The pieces of mask data in the masks 1A and 1B are each a piece of data for computing a logical AND with a piece of print data. In the masks 1A and 1B, "1" represents a piece of data permitting ink ejection from the corresponding nozzle (hereinafter referred to also as "permission data"). On the other hand, "0" represents a piece of data not permitting ink ejection (hereinafter referred to also as "non-permission data").

Specifically, in a case where a piece of data obtained by a logical AND operation on a piece of pixel data and a piece of mask data is "1", that piece of data will be a piece of print data designating ink ejection from the corresponding nozzle (ejection data), and a dot will be formed in the pixel corresponding to this piece of pixel data. On the other hand, in a case where a piece of data obtained by a logical AND operation on a piece of pixel data and a piece of mask data is "0", that piece of data will be a piece of print data not designating ink ejection from the corresponding nozzle (non-ejection data), and no dot will be formed in the pixel corresponding to this piece of pixel data.

The following description will be given on the assumption that the nozzle array N10 illustrated in FIG. 8A is the first nozzle array and the overlapping nozzles in the first nozzle array are the first overlapping nozzles, and that the nozzle array N20 illustrated in FIG. 8A is the second nozzle array and the overlapping nozzles in the second nozzle array are the second overlapping nozzles. In this case, the first overlapping nozzle 1e in the first nozzle array N10 corresponds to the pieces of data with the address y1 in the print data D and the mask 1A, and the first overlapping nozzle 1f corresponds to the pieces of data with the address y2 in the print data D and the mask 1A. Moreover, the first overlapping nozzle 1g corresponds to the pieces of data with the address y3 in the print data D and the mask 1A, and the first overlapping nozzle 1h corresponds to the pieces of data with the address y4 in the print data D and the mask 1A.

A piece of mask data representing "1" is arranged at all of the positions with the address y1 in the mask 1A, which is for the first nozzle array N10. Thus, by performing a logical AND operation on the pieces of the print data D and the mask data with the address y1, "1" and "0" in the print data D simply become ejection data and non-ejection data for the first overlapping nozzle 1e, respectively. At the positions with the addresses y2 and y3, pieces of mask data with "1" and "0" are both present. Thus, at the addresses of the pieces of mask data with "1", "1" and "0" in the print data D simply become ejection data and non-ejection data for the nozzles 1f and 1g, respectively. On the other hand, the pieces of the print data D corresponding to the pieces of mask data with "0" become non-ejection data for the first overlapping nozzles 1f and 1g. A piece of mask data with "0" is arranged at all of the positions with the address y4. Thus, by performing a logical AND operation on the pieces of the print data D and the mask data with the address y4, those pieces of the print data D become non-ejection data for the first overlapping nozzle 1h.

On the other hand, the second overlapping nozzle 2a in the second nozzle array N20 corresponds to the pieces of data with the address y1 in the print data D and the mask 1B, and the second overlapping nozzle 2b corresponds to the pieces of data with the address y2 in the print data D and the mask 1B. Moreover, the second overlapping nozzle 2c corresponds to the pieces of data with the address y3 in the print data D and the mask 1B, and the second overlapping nozzle 2d corresponds to the pieces of data with the address y4 in the print data D and the mask 1B.

A piece of mask data representing "0" is arranged at all of the positions with the address y1 in the mask 1B, which is for the second nozzle array N20. Thus, by performing a logical AND operation on the pieces of the print data D and the mask data with the address y1, "1" and "0" in the print data D become non-ejection data for the nozzle 2a. At the positions with the addresses y2 and y3, pieces of mask data with "1" and "0" are both present. Thus, at the addresses of the pieces of mask data with "1", "1" and "0" in the print data D become ejection data and non-ejection data for the nozzles 2b and 2c, respectively. On the other hand, the pieces of the print data D corresponding to the pieces of mask data with "0" become non-ejection data for the nozzles 2b and 2c. A piece of mask data with "1" is arranged at all of the positions with the address y4. Thus, by performing a logical AND operation on the pieces of the print data D and the mask data with the address y4, "1" and "0" in the print data D simply become ejection data and non-ejection data for the second overlapping nozzle 2d, respectively.

Pieces of print data generated by performing logical AND operations on the print data D and the masks 1A and 1B as described above are represented as print data DA and print data DB, respectively. The print data DA represents print data for the first overlapping nozzles 1e, 1f, 1g, and 1d. The print data DB represents print data for the second overlapping nozzles 2a, 2b, 2c, and 2d. In the print data DA and the print data DB, "o" represents a piece of data with a logical AND of "1", and "x" denotes a piece of data with a logical AND of "0". The ink will be ejected from the first overlapping nozzles in the first nozzle array N10 and the second overlapping nozzles in the second nozzle array N20 based on the print data DA and the print data DB thus obtained by logical AND operations on the print data D and the pieces of mask data.

The nozzle arrays in FIG. 11, which are associated with pixels, are represented such that reference sign i denotes a pixel in which a dot will be printed with the ink ejected from the corresponding first overlapping nozzle in the first nozzle array N10. Reference sign ii denotes a pixel in which a dot will be printed with the ink ejected from the corresponding second overlapping nozzle in the second nozzle array N20. Reference sign × denote a pixel in which no dot will be formed. As illustrated in FIG. 11, the region with the addresses y2 and y3 is defined as a complementary printing region where printing is performed by overlapping nozzles in the first and second nozzle arrays N10 and N20. The print data DA for the first nozzle array N10 and the print data DB for the second nozzle array N20 are generated as described above, and the overlapping portion performs printing based on the generated pieces of print data. Of the image regions to be printed on a print medium S by the overlapping portion, the image region where complementary printing is performed to complete an image with both the first and second nozzle arrays N10 and N20 will be referred to as "complementary image region". In the example illustrated in FIG. 11, the region with the addresses y2 and y3, formed by two pixels in the horizontal direction by four pixels in the vertical direction, is the complementary image region.

The above is the relationship between pieces of mask data and print data for the nozzle groups fixedly designated at end portions of the first and second nozzle arrays N10 and N20 (overlapping nozzle groups G1 and G2). Note that the relationship between the pieces of mask data and the print data illustrated in FIG. 11 assumes a state where the two adjacent chips are appropriately arranged, i.e., a state where the inter-chip distance is "0" and the nozzle shift process will therefore not be performed. However, adjacent chips are sometimes misaligned from the appropriate state (the state where the inter-chip distance is "0"). In a case where the pieces of mask data generated on the assumption that the chips are in the appropriately arranged state is used while the chips are actually misaligned, there will be a misalignment between the pieces of print data to be distributed and the nozzles. This leads to a possibility that the image printed by the overlapping portion may have a detect such as density unevenness. To address this, in the present embodiment, a plurality of masks are prepared for inter-chip distances, and the masks to be used are selectively set according to the nozzle shift amount determined based on an inter-chip distance to reduce image defects. A process of setting the pieces of mask data with the nozzle shift amount taken into account will be described below in detail.

(Setting Pieces of Mask Data According to Nozzle Shift Amount)

In the present embodiment, a plurality of types of masks corresponding to nozzle shift amounts determined based on inter-chip distances are prestored in the RAM 106 serving as a second storage unit. Of these masks, those corresponding to a nozzle shift amount are selected and used. A process of setting masks according to a nozzle shift amount will be described below with reference to FIGS. 12A to 12C.

Figure 12:
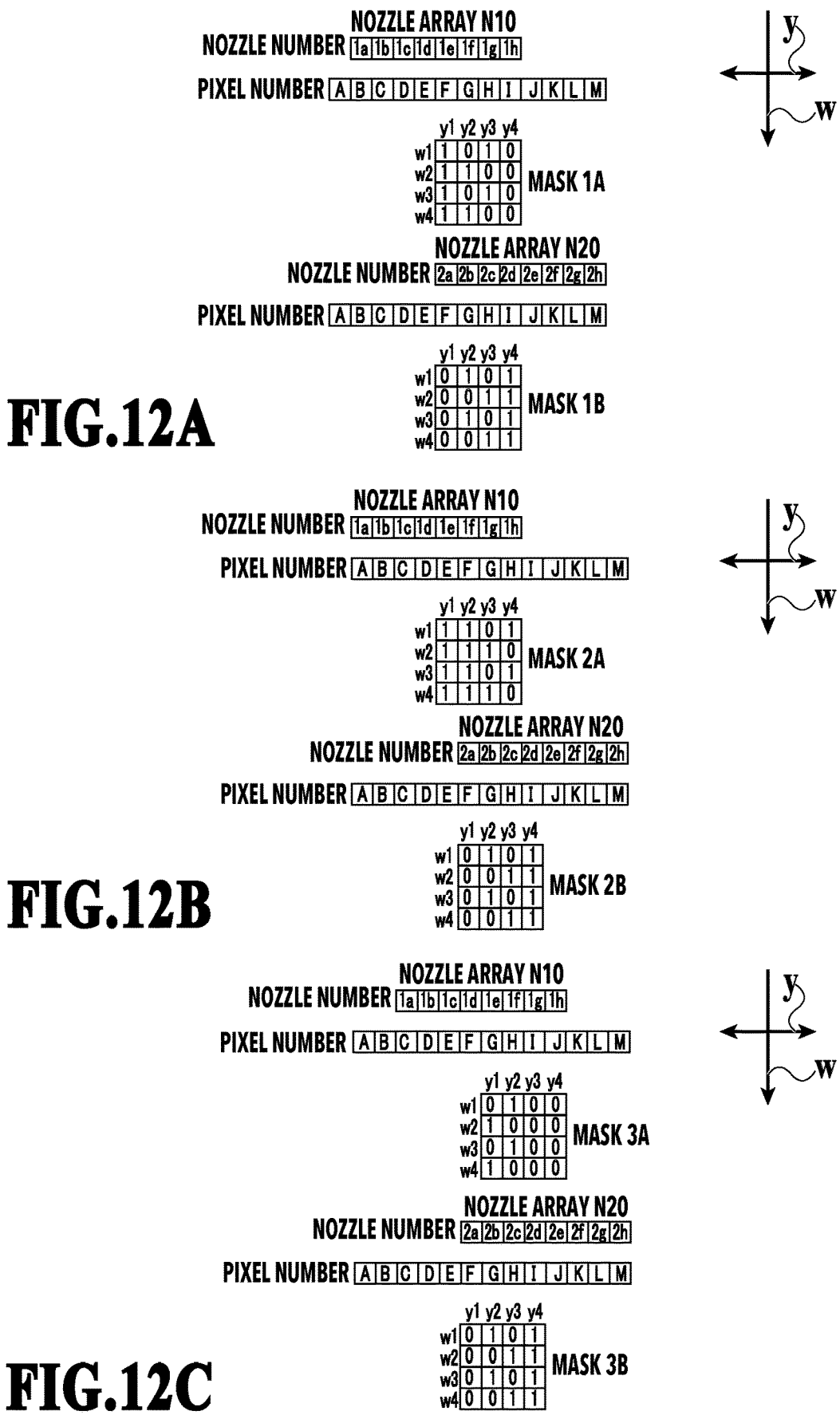
FIGS. 12A to 12C are diagrams illustrating positional relationships between pixel numbers, nozzle numbers, and selected masks.

FIG. 12A illustrates a positional relationship between pixel numbers in print data, nozzle numbers in the nozzle arrays N10 and N20, and selected masks in a case where the inter-chip distance is "0". Since the inter-chip distance is "0", the nozzle shift amount is set at "0" based on Table 1. Also, since the inter-chip distance is "0", in the overlapping portion set in the nozzle arrays N10 and N20 (overlapping nozzle groups G1 and G2), the nozzles 1e and 2a, 1f and 2b, 1g and 2c, and 1h and 2d are coincident with each other in the y direction, which is orthogonal to the conveyance direction of a print medium (w direction). This state is the appropriate positional relationship between the nozzle arrays N10 and N20. Here, by the nozzle shift process in S93, the pieces of print data (pixel data) with the pixel number B are allocated to the nozzle 1a in the nozzle array N10, and the pieces of print data with the pixel numbers C to I are allocated to the nozzles 1b to 1h, respectively.

In the case where the nozzle arrays N10 and N20 are in the appropriate positional relationship as above, the mask 1A is selected for the overlapping portion of the nozzle array N10 (the overlapping nozzle group G1), and the mask 1B is selected for the overlapping portion of the nozzle array N20 (overlapping nozzle group G2). Then, the overlapping nozzles 1e to 1h in the nozzle array N10 perform printing based on print data obtained by performing a masking process on the pieces of print data F to I with the mask 1A. The overlapping nozzles 2a to 2d in the nozzle array N20 perform printing based on print data obtained by performing a masking process on the pieces of print data F to I with the mask 1B. Specifically, the nozzles 1f and 2b perform complementary printing of the corresponding image region based on pieces of print data obtained by performing masking processes on the pieces of print data with the pixel number G. Moreover, the nozzles 1g and 2c perform complementary printing of the corresponding image region based on pieces of print data obtained by performing masking processes on the pieces of print data with the pixel number H. The nozzle 1e performs printing of the corresponding image region based on pieces of print data obtained by performing masking processes on the pieces of print data with the pixel number F. Moreover, the nozzle 2d performs printing of the corresponding image region based on pieces of print data obtained by performing masking processes on the pieces of print data with the pixel number I.

FIG. 12B illustrates a positional relationship between the pixel numbers, the nozzle numbers in the nozzle arrays N10 and N20, and selected masks in a case where the inter-chip distance is "+20". Since the inter-chip distance is "+20", the nozzle shift amount is set at "−1" based on Table 1. Here, of the nozzles in the overlapping portion, the nozzles 1f and 2a, 1g and 2b, and 1h and 2c are coincident with each other in the y direction, which is orthogonal to the conveyance direction of a print medium (w direction).

In the case where the nozzle shift amount is "−1", by the nozzle shift process in S93, the pieces of print data (pixel data) with the pixel number B are allocated to the nozzle 1a in the nozzle array N10, and the pieces of print data with the pixel numbers B to H are allocated to the nozzles 1b to 1h, respectively. This allocation of pieces of print data to the nozzles is different from that illustrated in FIG. 12A. The masks therefore need to be changed according to the nozzle shift. In this example, based on Table 1, the nozzle shift amount is set at "−1" in the case where the inter-chip distance is +20, and masks 2A and 2B are selected in the case where the nozzle shift amount is "−1". Note that the mask 2B is the same as the mask 1B mentioned above, but the mask 2A is different from the mask 1A mentioned above. In the mask 2A, all of the pieces of mask data with the addresses y1 and y2 are set at tone value "1". Thus, the pieces of print data with the pixel numbers E and F after a masking process with the mask 2A are the same as those before the masking process.

On the other hand, in the pieces of mask data with the addresses y3 and y4 in the mask 2A, both "1" and "0" are set. Thus, print data obtained by logical AND operations on the pieces of print data and mask data with the pixel numbers G and H designates either ejection or non-ejection for the pixels where the piece of mask data is "1", and designates non-ejection for all pixels where the piece of mask data is "0". These pieces of mask data with the addresses y3 and y4 in the mask 2A are in a complementary relationship with the pieces of mask data with the address y2 and y3 in the mask 2B.

With the masks 2A and 2B selected, the overlapping nozzles 1e to 1h in the nozzle array N10 perform printing based on print data obtained by performing a masking process on the pieces of print data E to H with the mask 2A. The overlapping nozzles 2a to 2d in the nozzle array N20 perform printing based on print data obtained by performing a masking process on the pieces of print data F to I with the mask 2B. Specifically, the nozzles 1g and 1h perform printing of the corresponding image regions based on pieces of print data obtained by logical AND operations on the pieces of print data with the pixel numbers G and H and the pieces of mask data with the addresses y3 and y4 in the mask 2A. Moreover, the nozzles 2b and 2c perform printing of the corresponding image regions based on pieces of print data obtained by logical AND operations on the pieces of print data with the pixel numbers G and H and the pieces of mask data with the addresses y2 and y3 in the mask 2B. As a result, complementary printing is performed on the pieces of print data with the pixel numbers G and H by the nozzles 1g and 2b and the nozzles 1h and 2c, respectively. In the mask 2B, all of the pieces of mask data with the address y4 are set at "1". Thus, the pieces of print data with the pixel number I after a masking process with the mask 2B are the same as those before the masking process. These pieces of print data I will be printed by the nozzle 2d.

As described above, even in the case where the inter-chip distance is +20, selecting a nozzle shift process and masks according to the nozzle shift amount prevents displacement of the landing position of the ink on a print medium. This enables the overlapping portion to form an appropriate image without density unevenness such as an unprinted stripe.

FIG. 12C illustrates a positional relationship between the pixel numbers, the nozzle numbers in the nozzle arrays N10 and N20, and selected masks in a case where the inter-chip distance is "−20". Since the inter-chip distance is "−20", the nozzle shift amount is set at "+1" based on Table 1. Here, of the nozzles in the overlapping portion, the nozzles 1e and 2b, 1f and 2c, and 1g and 2d are coincident with each other in the y direction, which is orthogonal to the conveyance direction of a print medium (w direction).

In the case where the nozzle shift amount is "+1", by the nozzle shift process in S93, the pieces of print data (pixel data) with the pixel number C are allocated to the nozzle 1a in the nozzle array N10, and the pieces of print data (pixel data) with the pixel numbers D to J are allocated to the nozzles 1b to 1h, respectively. This allocation of pieces of print data to the nozzles is different from that illustrated in FIG. 12A. The pieces of mask data therefore need to be changed according to the nozzle shift. Masks 3A and 3B are selected in the case where the inter-chip distance is "−20". The mask 3B is the same as the mask 1B mentioned above, but the mask 3A is different from the mask 1A mentioned above. In the mask 3A, all of the pieces of mask data with the addresses y3 and y4 are set at "0". Thus, the pieces of print data with the pixel numbers I and J will be pieces of print data designating non-ejection by being subjected to a masking process with the mask 3A.

On the other hand, in the pieces of mask data with the addresses y1 and y2 in the mask 3A, tone values "1" and "0" are both set. Thus, print data obtained by logical AND operations on the pieces of print data and the pieces of mask data with the addresses y1 and y2 in the mask 3A designates either ejection or non-ejection for the pixels where the piece of mask data is "1", and designates non-ejection for all pixels where the piece of mask data is "0". These pieces of mask data with the addresses y1 and y2 in the mask 3A are in a complementary relationship with the pieces of mask data with the address y2 and y3 in the mask 3B.

With the masks 3A and 3B selected, the nozzles 1e to 1h in the nozzle array N10 perform printing based on print data obtained by performing a masking process on the pieces of print data G to J with the mask 3A. Also, the nozzles 2a to 2d in the nozzle array N20 perform printing based on print data obtained by performing a masking process on the pieces of print data F to I with the mask 3B. Specifically, the nozzles 1e and 1f perform printing of the corresponding image regions based on pieces of print data obtained by logical AND operations on the pieces of print data with the pixel numbers G and H and the pieces of mask data with the addresses y1 and y2 in the mask 3A. Moreover, the nozzles 2b and 2c perform printing of the corresponding image regions based on pieces of print data obtained by logical AND operations on the pieces of print data with the pixel numbers G and H and the pieces of mask data with the addresses y2 and y3 in the mask 3B. As a result, complementary printing is performed on the pieces of print data with the pixel numbers G and H by the nozzles 1e and 2b and the nozzles 1f and 2c, respectively. The pieces of print data with the pixel number I are printed by the nozzle 2d.

As described above, even in the case where the inter-nozzle distance between nozzle arrays is −20, selecting a nozzle shift process and masks according to the nozzle shift amount prevents displacement of the landing position of the ink on a print medium. This enables the overlapping portion to form a good image without density unevenness such as an overprinted stripe.

The above description has been given of the selection of the shift process and the masks in the case where the inter-chip distance is "0" or "±20". In a case where the inter-chip distance is "±15", "±25", or "±30" too, the nozzle shift amount is set at ±1, and a similar process to the process performed with an inter-chip distance of "±20" is performed. Note that the set values of the nozzle shift amount are not limited to the values listed in Table 1 ("0" and "±1"), and other values, e.g., ±2 and ±3, can be set according to the inter-chip distance. In this case, masks suitable for these nozzle shift amounts are prepared. Also, the masks are not limited to ones for four nozzles, and may be ones for a different number of nozzles.

As described above, in the present embodiment, even in the case where adjacent chips are misaligned by a distance greater than or equal to the nozzle resolution (arrangement interval between nozzles), the overlapping portion of their nozzle arrays can form a good image with no or reduced density unevenness.

In the above description, a plurality of masks are selected. Alternatively, the read-out position (address) of each piece of mask data in the masks stored in the storage unit such as the RAM 106 may be changed according to the nozzle shift amount. In this way, it is possible to use a single mask to implement a plurality of masking processes corresponding to nozzle shift amounts as in the case of selecting masks out of a plurality of masks.

(Processing in Case where Inter-Chip Distance is Less than Nozzle Resolution)

Next, processing performed in a case where the inter-chip distance is less than the nozzle resolution will be described. As mentioned earlier, in the case where the inter-chip distance is less than the nozzle resolution, sufficient image correction may not be achieved only by selecting a nozzle shift process and masks as described above. For example, in a case where the inter-chip distance is "+10", performing a nozzle shift by one pixel will end up in a state where the inter-chip distance is "−10", since the nozzle resolution is 1200 dpi (approximately 20 μm). In this case, the density unevenness that is likely to appear tends to change from an unprinted stripe to an overprinted stripe. Nonetheless, an image defect appears.

To address this, in the present embodiment, the ink application amount from the overlapping portion of the adjacent nozzle arrays is increased or decreased based on the inter-chip distance less than the nozzle resolution. Specifically, masks ranked according to the inter-chip distance less than the nozzle resolution are prepared, and the ink application amount from the overlapping portion is controlled using those masks. In this example, sets of masks differing in the number of pieces of permission data (mask data "1") in the complementary image region are prepared, and the ink application amount from the overlapping portion is increased or decreased by using one of these sets of masks.

The masks illustrated in FIGS. 12A to 12C are configured such that, in a case where the overlapping portion of the nozzle arrays N10 and N20 prints a solid image in the complementary image region, the ink application amount will be the same in the regions to be printed by the overlapping nozzle group G1 and the regions to be printed by the overlapping nozzle group G2. Specifically, in the mask for the nozzle array N10 and the mask for the nozzle array N20, the pieces of permission data, which permit ink ejection, are set in a complementary relationship with each other. For example, by combining the pieces of ejection permission data in the mask 1A and the pieces of permission data in the mask 1B, a single piece of permission data is arranged in each pixel region in the complementary image region, which includes eight pixel regions in total formed of two pixels in the horizontal direction by four pixels in the vertical direction. Thus, in the case of printing a solid image, a single ink droplet lands on each pixel in the complementary image region. The ink application amount in this state, in which the ink is applied so as to shoot a single ink droplet to each pixel region, will be referred to as 100 percent (%).

On the other hand, masks used in the case where the inter-chip distance is less than the nozzle resolution are such that the complementary image region can be printed with an ink application amount other than 100% in the case of printing a solid image. Details will be described below.

Figure 13:
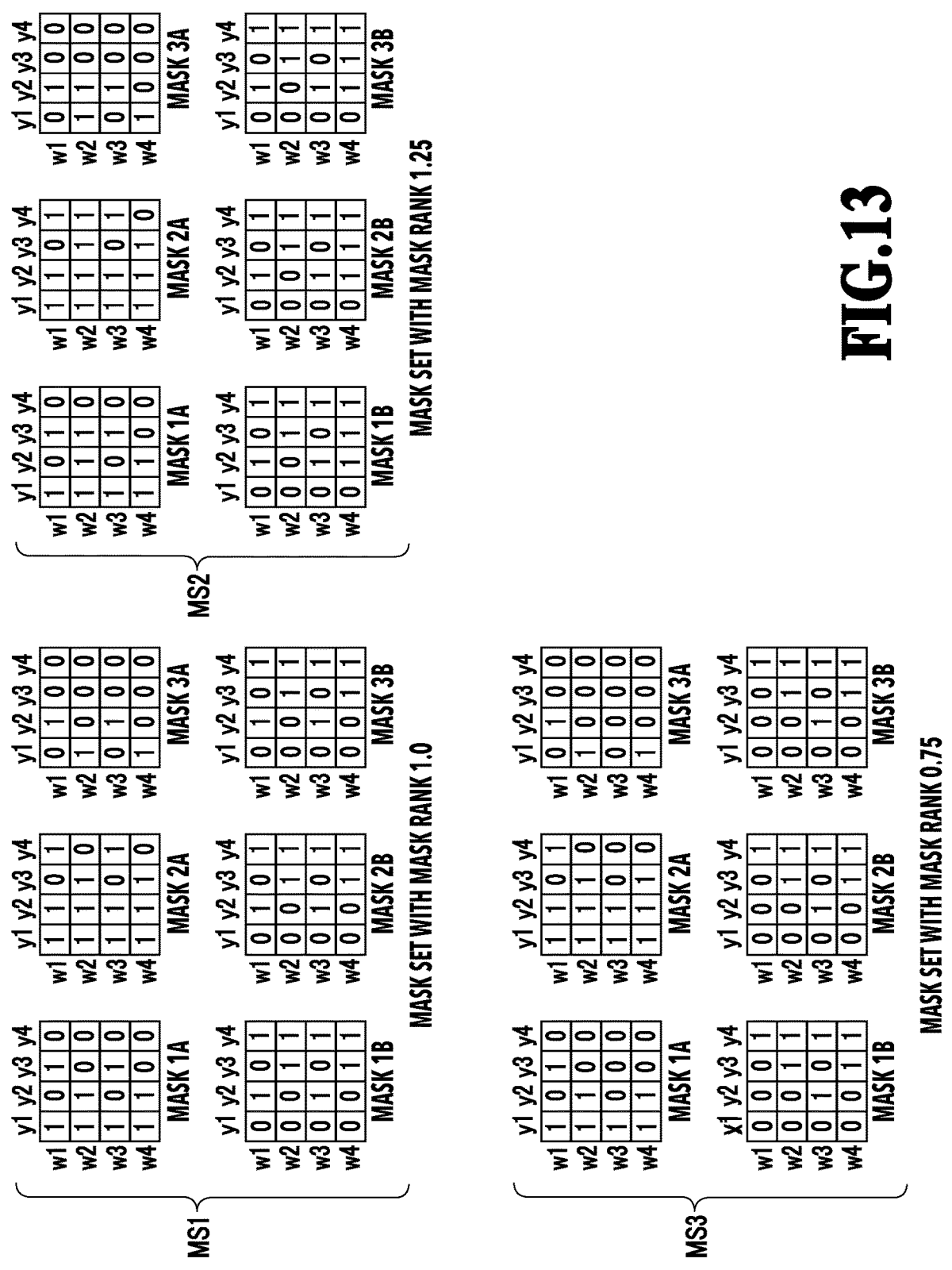

FIGS. 13A to 13C are diagrams illustrating masks used in the present embodiment. In the present embodiment, three types of mask sets MS1, MS2, and MS3 classified as ones with mask ranks 0.75, 1.0, and 1.25, respectively, are stored in the RAM 106. The masks with the same reference signs included in the three types of mask sets (1A, 1B, 2A, 2B, 3A, and 3B) are masks differing only in the total number of pieces of permission data (mask data "1") among the pieces of mask data in the complementary image region (the pieces of mask data with the addresses y2 and y3, y3 and y4, or y1 and y2), which is formed by two pixels in the horizontal direction by four pixels in the vertical direction.

The mask set MS1 with mask rank 1.0 has three pairs of masks (1A and 1B, 2A and 2B, 3A and 3B) for handling nozzle shift processes. These masks are the same as those illustrated in FIGS. 12A to 12C, and each two paired masks are in a complementary relationship with each other. Thus, combining the pieces of permission data in the mask for the nozzle array N10 and the pieces of permission data in the mask for the nozzle array N20 in the complementary image region, which is a region formed of two pixels in the horizontal direction by four pixels in the vertical direction, there are eight pixels of permission data in total. Hence, in a case of printing a solid image in the complementary image region, the ink application amount for the region will be 100%.

Like the mask set MS1, the mask set MS2 with mask rank 1.25 has three pairs of masks (1A and 1B, 2A and 2B, 3A and 3B) for handling nozzle shift processes. Combining the pieces of permission data in the mask for the nozzle array N10 between the two paired masks and the pieces of permission data in the mask for the nozzle array N20 in the complementary image region, there are 10 pixels of permission data in total. Hence, in a case of printing a solid image in the complementary image region, the ink application amount for the region will be 125%.

The mask set MS3 with mask rank 0.75 likewise has three pairs of masks (1A and 1B, 2A and 2B, 3A and 3B) for handling nozzle shift processes. Combining the pieces of permission data in the mask for the nozzle array N10 between the two paired masks and the pieces of permission data in the mask for the nozzle array N20 in the complementary image region, there are six pixels of permission data in total. Hence, in a case of forming a solid image in the complementary image region, the ink application amount for the region will be 75%.

As described above, using masks with a different mask rank can increase or decrease the ink application amount for the complementary image region.

Here, with reference to Table 2 below, a description will be given of a procedure of selecting masks with nozzle shifts as illustrated in FIGS. 12A to 12C taken into account, and selecting masks with the increase of decrease in the ink application amount for the complementary image region taken into account.

Table 2 illustrates an example of nozzle shift amounts and mask ranks (Mask Rank) set for inter-chip distances of "+30" to "−30".

TABLE 2

Example of Nozzle Shift Amounts and Mask Ranks Set for Inter-chip Distances

| A (Inter-chip Distance (μm)) | B (Nozzle Shift Amount (Pixel)) | C (Inter-chip Distance after Nozzle Shift (μm)) | D Stripe Visibility after Nozzle Shift | E (Mask Rank) | F Stripe Visibility after Processing in Present Embodiment |
|---|---|---|---|---|---|
| +30 | −1 | +10 | A minor unprinted stripe is visible | 1.25 | No visible stripe |
| +25 | −1 | +5 | No visible stripe | 1.0 | No visible stripe |
| +20 | −1 | 0 | No visible stripe | 1.0 | No visible stripe |
| +15 | −1 | −5 | No visible stripe | 1.0 | No visible stripe |
| +10 | 0 | +10 | A minor unprinted stripe is visible | 1.25 | No visible stripe |
| +5 | 0 | +5 | No visible stripe | 1.0 | No visible stripe |
| 0 | 0 | 0 | No visible stripe | 1.0 | No visible stripe |
| −5 | 0 | −5 | No visible stripe | 1.0 | No visible stripe |
| −10 | 0 | −10 | A minor overprinted stripe is visible | 0.75 | No visible stripe |
| −15 | +1 | +5 | No visible stripe | 1.0 | No visible stripe |
| −20 | +1 | 0 | No visible stripe | 1.0 | No visible stripe |
| −25 | +1 | −5 | No visible stripe | 1.0 | No visible stripe |
| −30 | +1 | −10 | A minor overprinted stripe is visible | 0.75 | No visible stripe |

First, the setting of the nozzle shift amount will be described. As illustrated in columns A and B in Table 2, in a case where the inter-chip distance is "+15" or more, the nozzle shift amount is set at "−1" to perform a nozzle shift by one pixel in the direction in which the adjacent chips get closer to each other. As illustrated in columns A and B in Table 2, in a case where the inter-chip distance is "−15" or less, the nozzle shift amount is set at "+1" to perform a nozzle shift by one pixel in the direction in which the chips get farther away from each other. The above nozzle shift process is executed in S93 in FIG. 9.

Next, the mask selection process will be described. As illustrated in columns C and E in Table 2, in a case where the inter-chip distance after the nozzle shift is "+10" or "−10", the masks with mask rank 1.25 or the masks with mask rank 0.75 are selected to increase or decrease the ink application amount for the complementary image region. Specifically, in a case where the inter-chip distance after the nozzle shift is "+10", a minor unprinted stripe tends to be visible, as described in column D in Table 2, and the ink application amount is therefore increased to about 125% of the normal ink application amount by using the masks with mask rank 1.25. In this way, the visibility of the unprinted stripe is reduced, as described in column F in Table 2. On the other hand, in a case where the inter-chip distance after the nozzle shift is "−10", a minor overprinted stripe tends to be visible, as described in column D in Table 2, and the ink application amount is therefore decreased to about 75% of the normal ink application amount by using the masks with mask rank 0.75. In this way, the visibility of the overprinted stripe is reduced, as described in column F in Table 2.

In a case where the inter-chip distance is "+30", the nozzle shift amount is "−1", so that the inter-chip distance is corrected by −20 Thus, the inter-chip distance after the correction is "+10", and there will be a minor visible unprinted stripe in the complementary image region, as described in column D in Table 2. Thus, mask rank 1.25 is selected to increase the ink application amount for the complementary image region. In this way, the visibility of the unprinted stripe is reduced, as described in column F in Table 2. The masks selected in this case are the masks 2A and 2B in the mask set MS2 with mask rank 1.25 illustrated in FIG. 13B. The pieces of mask data corresponding to the complementary image region in the mask 2A in the mask set MS2 are set for the nozzles 1g and 1h in the nozzle array N10. The pieces of mask data corresponding to the complementary image region in the mask 2B in the mask set MS2 are set for the nozzles 2b and 2c in the nozzle array N20. In the masks 2A and 2B in the mask set MS2, there are 10 pixels of permission data in total out of the pieces of mask data corresponding to the complementary image region. Thus, in a case where the nozzle arrays N10 and N20 print a solid image, the ink application amount for the complementary image region will be 125%. Increasing the ink application amount for the complementary image region as above reduces the visibility of the minor unprinted stripe in the complementary image region. This makes it possible to form an image with higher quality.

In a case where the inter-chip distance is "−30", the nozzle shift amount is "+1", so that the inter-chip distance is corrected by +20 Thus, the inter-chip distance after the correction is "−10", and there will be a minor visible overprinted stripe in the complementary image region, as described in column D in Table 2. Thus, mask rank 0.75 is selected to decrease the ink application amount for the complementary image region. In this way, the visibility of the overprinted stripe is reduced, as described in column F in Table 2. The masks selected in this case are the masks 3A and 3B in the mask set MS3 with mask rank 0.75 illustrated in FIG. 13C.

The pieces of mask data corresponding to the complementary image region in the mask 3A in the mask set MS3 are set for the nozzles 1e and if in the nozzle array N10. The pieces of mask data corresponding to the complementary image region in the mask 3B in the mask set MS3 are set for the nozzles 2b and 2c in the nozzle array N20. In the masks 3A and 3B in the mask set MS3, there are six pixels of permission data in total out of the pieces of mask data corresponding to the complementary image region. Thus, in a case where the nozzle arrays N10 and N20 print a solid image, the ink application amount for the complementary image region will be 75%. Decreasing the ink application amount for the complementary image region as above reduces the visibility of the minor overprinted stripe in the complementary image region. This makes it possible to form an image with higher quality.

The setting of the nozzle shift amount and the masking process corresponding to the mask rank described above are performed for the overlapping portions of all nozzle arrays provided in the print head 8. The image processing unit 108 illustrated in FIG. 2 executes these processes in S95 in FIG. 9.

After executing the image correction process described above, the image processing unit 108 of the controller unit 100 generates print data in a form suitable for printing with the print head 8 from the corrected print data (FIG. 6: S66), and sends the generated print data to the print engine unit 200. The print engine unit 200 drives the print head 8 based on the received print data to perform printing on a print medium S.

As described above, in the present embodiment, pieces of mask data are selected with the nozzle shift amount determined from the inter-chip distance and the inter-chip distance after a nozzle shift process taken into account. This prevents density unevenness from appearing even in a case where the accuracy of mounting of the chips in a multi-chip print head is low. There can be a case where chips are misaligned such that the inter-nozzle distance is more than or equal to the arrangement interval between nozzles, and a case where the chips are misaligned such that the inter-nozzle distance is less than the nozzle arrangement interval. In the present embodiment, it is possible to prevent density unevenness from appearing in both cases and thus obtain a high-quality image.

Second Embodiment

Next, a second embodiment of the present invention will be described.

In the first embodiment described above, the ink application amount for a complementary image region is increased or decreased based on pieces of fixed mask data stored in the RAM 106. In this case, the ink application amount may be excessively increased or decreased depending on the tone value of the input image. This may conversely impair the image quality. For example, assume that adjacent chips are misaligned in the direction in which they get farther away from each other. In this case, in the above embodiment, masks that increase the ink application amount may be selected based on the inter-chip distance even if the image is a low-tone image (an image with a small ink application amount). Consequently, the portion with the increased ink application amount may be visually observed as an overprinted stripe. Specifically, a low-tone portion with a small ink application amount is originally in a state where an unprinted stripe is not easily visible. In a case where masks that increase the ink application amount are selected for that image, the portion with the ink application amount increased by the masks may be visually observed as an overprinted stripe.

Assume also that adjacent chips are misaligned in the direction in which they get closer to each other. In this case, in the above embodiment, masks that decrease the ink application amount may be selected based on the inter-chip distance even if the image is a high-tone image (an image with a large ink application amount). A high-tone portion with a large ink application amount is originally in a state where an overprinted stripe is not easily visible. In a case where masks that decrease the ink application amount are selected for that image, the portion with the ink application amount decreased by the masks may be visually observed as an unprinted stripe.

To address this, in the present embodiment, the pixels in each complementary image region in the multivalued input image data (RGB data) received from the host apparatus 400, which includes 8-bit information for each of R, G, and B, is subjected to a tone correction on a tone-by-tone basis.

Table 3 illustrates relationships between the tone values of images to be formed and tone correction coefficients in tone correction tables. The tone values are 256-level values each indicating a degree of density to be allocated to the ink color. Tone value "255" is the highest density. Tone value "0" is the lowest density. The larger the tone value, the higher the tone. The smaller the tone value, the lower the tone. Moreover, in Table 3, tone correction tables T0.8, T0.9, T1.0, T1.1, and T1.2 are illustrated as the tone correction tables. A tone correction table with a larger number attached to its reference sign T is a tone correction table with a larger correction coefficient. Thus, the tone correction table T1.2 has the largest correction coefficient "1.2", and the tone correction table T0.8 has the smallest correction coefficient "0.8".

In a case where the value of the tone correction coefficient is "1.0", no tone correction is performed. In a case where the value of the tone correction coefficient is more than "1.0" (e.g., 1.1), the tone value of the received image is increased at a predetermined rate. In a case where the value of the tone correction coefficient is less than "1.0" (e.g., 0.9), the tone value of the received image is decreased at a predetermined rate.

TABLE 3

Tone Correction Tables and Correction Coefficients

| Tone Value | Tone Correction T0.8 | Tone Correction T0.9 | Tone Correction T1.0 | Tone Correction T1.1 | Tone Correction T1.2 |
|---|---|---|---|---|---|
| 255 | 0.8 | 0.9 | 1.0 | 1.0 | 1.0 |
| 240 | 0.8 | 0.9 | 1.0 | 1.0 | 1.0 |
| 224 | 0.85 | 0.9 | 1.0 | 1.0 | 1.0 |
| 208 | 0.85 | 0.9 | 1.0 | 1.0 | 1.0 |
| 192 | 0.9 | 0.95 | 1.0 | 1.0 | 1.0 |
| 176 | 0.9 | 0.95 | 1.0 | 1.0 | 1.0 |
| 160 | 0.95 | 0.95 | 1.0 | 1.0 | 1.0 |
| 144 | 0.95 | 0.95 | 1.0 | 1.0 | 1.0 |
| 128 | 1.0 | 1.0 | 1.0 | 1.0 | 1.0 |
| 112 | 1.0 | 1.0 | 1.0 | 1.05 | 1.05 |
| 96 | 1.0 | 1.0 | 1.0 | 1.05 | 1.05 |
| 80 | 1.0 | 1.0 | 1.0 | 1.05 | 1.1 |
| 64 | 1.0 | 1.0 | 1.0 | 1.05 | 1.1 |
| 48 | 1.0 | 1.0 | 1.0 | 1.1 | 1.15 |
| 32 | 1.0 | 1.0 | 1.0 | 1.1 | 1.15 |
| 16 | 1.0 | 1.0 | 1.0 | 1.1 | 1.2 |

Table 4 illustrates an example of nozzle shift amounts, mask ranks, and tone correction tables set for inter-chip distances.

TABLE 4

Tone Correction Tables and Correction Coefficients

| A (Inter-chip Distance (μm)) | B (Nozzle Shift Amount (Pixel)) | C (Mask Rank) | D (Tone Correction Table) |
|---|---|---|---|
| +30 | −1 | 1.25 | 0.9 |
| +25 | −1 | 1.0 | 1.0 |
| +20 | −1 | 1.0 | 1.0 |
| +15 | −1 | 1.0 | 1.0 |
| +10 | 0 | 1.25 | 0.9 |
| +5 | 0 | 1.0 | 1.0 |
| 0 | 0 | 1.0 | 1.0 |
| −5 | 0 | 1.0 | 1.0 |
| −10 | 0 | 0.75 | 1.1 |
| −15 | +1 | 1.0 | 1.0 |
| −20 | +1 | 1.0 | 1.0 |
| −25 | +1 | 1.0 | 1.0 |
| −30 | +1 | 0.75 | 1.1 |

In the present embodiment, an inter-chip distance listed in column A in Table 4 is obtained, and the nozzle shift amount, mask rank, and tone correction table corresponding to the obtained inter-chip distance are set. Based on the set values, a process of increasing or decreasing the ink application amount for the complementary image region performed in the first embodiment is performed. Moreover, a tone correction is performed on the image based on the correction coefficient values in the tone correction table. This tone correction is performed between the color conversion process in S62 and the quantization process in S63 in FIG. 6. In a case of using pieces of mask data that increase the ink application amount for the complementary image region based on the inter-chip distance, the tone value of the complementary image region is lowered to decrease the amount of the ink to be applied to the complementary image region, if the complementary image region is a high-tone portion. This prevents an overprinted stripe from appearing due to an excessive increase in ink application amount.

On the other hand, in a case of using pieces of mask data that decrease the ink application amount for the complementary image region for printing of a high-tone image, the tone value of the pixels in the complementary image region is raised to increase the application amount. This prevents an unprinted stripe from appearing due to an excessive decrease in ink application amount.

In the present embodiment, a case of correcting the tone value of print data has been presented. Alternatively, the configuration may be such that the pieces of mask data are changed in the conveyance direction of a print medium, and the mask rank of the masks is changed according to the tone value.

Other Embodiments

In the above embodiments, a nozzle shift process, a process of selecting masks corresponding to a nozzle shift amount, and a process of increasing or decreasing the ink application amount for the complementary image region are performed based on the inter-chip distance. In this way, the density unevenness that appears in the case where the inter-chip distance is more than or equal to the nozzle resolution, and the density unevenness that appears in the case where the inter-chip distance is less than the nozzle resolution are both prevented from appearing. However, the present invention is not limited to the above. The density unevenness that appears in the case where the inter-chip distance is large may be prevented from appearing by performing a nozzle shift process and a process of selecting masks corresponding to a nozzle shift amount based on the inter-chip distance.

In the above embodiments, inter-chip distances are saved in a memory, and the nozzle shift amount and the masks are set based on an inter-chip distance read out of the memory. However, the present invention is not limited to the above. Nozzle shift amounts and masks corresponding to inter-chip distances measured in advance may be saved in the memory. Also, the configuration may be such that, in S92, the inter-chip distance is obtained by analyzing an actually printed pattern, like Japanese Patent Laid-Open No. 2004-122546.

In the above embodiments, an example has been described in which the conveyance direction of a print medium and the nozzle array direction are orthogonal to each other. However, the present invention is not limited to the above. Specifically, the configuration may be such that a plurality of nozzle arrays each having nozzles arrayed at a predetermined angle to a straight line orthogonal to the conveyance direction of a print medium are arranged along the array direction of the nozzle arrays.

In the above embodiments, an example has been described in which the printing apparatus includes a print head in which a plurality of chips are arranged in a staggered pattern. However, the chip arrangement is not limited to a staggered arrangement. For example, an in-line arrangement may be employed in which a plurality of chips are arranged straight along a direction crossing the conveyance direction of a print medium. In this case, the crossing direction is not limited to a direction orthogonal to the conveyance direction. In the above embodiments, the planar shape of each chip is parallelogrammatic. However, the shape is not limited to this shape and may be, for example, a rectangular shape, a trapezoidal shape, or another shape. As described above, various chip shapes and arrangements and nozzle array directions are available for the plurality of chips. In any case, however, the nozzle arrays in adjacent chips must be arranged so as to form an overlapping portion where they overlap each other in a view from the conveyance direction of a print medium.

The above embodiments have been described by taking as an example a full line-type printing apparatus that performs printing by ejecting inks from a long print head held at a fixed position while continuously conveying a print medium. However, the present invention is not limited to the above. The present invention is also applicable to serial-type printing apparatuses that perform printing while scanning a relatively long print head including a plurality of connected chips in a direction crossing the conveyance direction of a print medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to obtain a high-quality image even in a case where adjacent chips are misaligned by a distance greater than or equal to their nozzle resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-009634, filed Jan. 25, 2022, which is hereby incorporated by reference wherein in its entirety.

What is claimed is:

1. An image processing apparatus for performing processing of image data in order to print an image on a print medium with a print head in which a first chip having a first nozzle array and a second chip having a second nozzle array are arranged, by causing the first nozzle array and the second nozzle array to eject a same ink while scanning the print head and the print medium relative to each other in a first direction,
   the first nozzle array and the second nozzle array each being formed by arraying a plurality of nozzles,
   the first chip and the second chip in the print head being arranged so as to form an overlapping portion where an end region of the first nozzle array and an end region of the second nozzle array overlap each other in a view from the first direction, the image processing apparatus comprising:
   a first obtaining unit configured to obtain pieces of binary print data in which whether to eject the ink or not to eject the ink is defined on a pixel-by-pixel basis based on multivalued input image data;
   a second obtaining unit configured to obtain an inter-nozzle distance representing an amount of deviation from a normal distance in a second direction orthogonal to the first direction between a first end nozzle in the first nozzle array and a second end nozzle in the second nozzle array in a state where the first chip and the second chip are appropriately arranged; and
   an allocation unit configured to allocate the pieces of print data to the nozzles in the first nozzle array and the second nozzle array based on the inter-nozzle distance, wherein
   the allocation unit performs a shift process of shifting allocation positions of the pieces of print data relative to the nozzles from the allocation positions in a state where the inter-nozzle distance is the normal distance, based on the inter-nozzle distance, and changes a distribution process of distributing the pieces of print data to the nozzles located in the overlapping portion, according to the inter-nozzle distance.

2. The image processing apparatus according to claim 1, wherein the allocation unit shifts the pieces of print data such that a distance in the second direction between positions of pixels in the image to be formed on the print medium and positions of the nozzles responsible for forming the pixels is less than or equal to an arrangement interval between the nozzles.

3. The image processing apparatus according to claim 1, wherein the allocation unit performs the distribution process such that the image to be printed on a region of the print medium corresponding to the overlapping portion will be completed with the ink ejected from the nozzle in the first nozzle array located in the overlapping portion and the ink ejected from the nozzle in the second nozzle array located in the overlapping portion.

4. The image processing apparatus according to claim 1, wherein in a case where a distance between the first chip and the second chip in the second direction is more than an appropriate distance and the inter-nozzle distance is less than an arrangement interval between the nozzles, the allocation unit performs the distribution process such that an ink application amount on a region of the print medium corresponding to the overlapping portion will be larger than the ink application amount in a case where the inter-nozzle distance is equal to the arrangement interval between the nozzles.

5. The image processing apparatus according to claim 1, wherein in a case where a distance between the first chip and the second chip in the second direction is less than an appropriate distance and the inter-nozzle distance is less than an arrangement interval between the nozzles, the allocation unit performs the distribution process such that an ink application amount on a region of the print medium corresponding to the overlapping portion will be smaller than the ink application amount in a case where the inter-nozzle distance is equal to the arrangement interval between the nozzles.

6. The image processing apparatus according to claim 1, wherein in a case where a distance between the first chip and the second chip in the second direction is more than an appropriate distance, and a distance in the second direction between positions of pixels in the image to be formed on the print data and positions of the nozzles responsible for forming the pixels after the shifting of the pieces of print data by the shift process is less than an arrangement interval between the nozzles, the allocation unit performs the distribution process such that an ink application amount on a region of the print medium corresponding to the overlapping portion will be larger than the ink application amount in a case other than the above case.

7. The image processing apparatus according to claim 1, wherein in a case where a distance between the first chip and the second chip in the second direction is less than an appropriate distance, and a distance in the second direction between positions of pixels in the image to be formed on the print data and positions of the nozzles responsible for forming the pixels after the shifting of the pieces of print data by the shift process is less than an arrangement interval between the nozzles, the allocation unit performs the distribution process such that an ink application amount on a region of the print medium corresponding to the overlapping portion will be smaller than the ink application amount in a case other than the above case.

8. The image processing apparatus according to claim 1, wherein the allocation unit performs the distribution process such that a complementary printing is performed with the first nozzle array and the second nozzle array on a complementary image region defined in an image region corresponding to the overlapping portion, and the image of a region other than the complementary image region is printed with any one of the first nozzle array and the second nozzle array.

9. The image processing apparatus according to claim 8, wherein the allocation unit performs the distribution process such that an ink application amount for the complementary image region will be larger or smaller than an ink application amount for the region other than the complementary image region according to the inter-nozzle distance.

10. The image processing apparatus according to claim 1, further comprising:
   a first storage unit configured to store the inter-nozzle distance; and
   a second storage unit configured to store a plurality of masks each including pieces of mask data indicating whether to permit or not permit ink ejection from the nozzles, wherein
   the allocation unit sets a shift amount by which to perform the shift process based on the inter-nozzle distance obtained from the first storage unit, selects a predetermined mask from the plurality of masks according to the shift amount, and performs the distribution process by using the selected mask.

11. The image processing apparatus according to claim 10, wherein
the second storage unit stores a plurality of masks each given a rank corresponding to a state where the inter-nozzle distance is equal to an arrangement interval between the nozzles, a state where the inter-nozzle distance is more than the arrangement interval between the nozzles, and a state where the inter-nozzle distance is less than the arrangement interval between the nozzles, and
the allocation unit selects a rank according to a distance in the second direction between positions of pixels in the image to be formed on the print medium and positions of the nozzles responsible for forming the pixels after performing the shift process, and performs the distribution process by using a mask corresponding to the selected rank.

12. The image processing apparatus according to claim 10, further comprising a control unit configured to control to a tone value of the input image data, wherein
the control unit lowers the tone value of a high-tone portion of the input image data in a case where the mask that increases an ink application amount on the print medium by the nozzles located in the overlapping portion is selected, and raises the tone value of a low-tone portion of the input image data in a case where the mask that decreases the ink application amount on the print medium by the nozzles located in the overlapping portion is selected.

13. A printing apparatus comprising:
a print head in which a first chip having a first nozzle array formed by arraying a plurality of nozzles and a second chip having a second nozzle array formed by arraying a plurality of nozzles are arranged in a predetermined direction,
a control unit configured to print an image on a print medium by causing the first nozzle array and the second nozzle array to eject a same ink while scanning the print head and the print medium relative to each other in a first direction; and
an image processing unit configured to perform processing of image data, wherein
the first chip and the second chip in the print head are arranged so as to form an overlapping portion where an end region of the first nozzle array and an end region of the second nozzle array overlap each other in view from the first direction,
the image processing unit includes
a first obtaining unit configured to obtain pieces of binary print data in which whether to eject the ink or not to eject the ink is defined on a pixel-by-pixel basis based on multivalued input image data,
a second obtaining unit configured to obtain an inter-nozzle distance representing an amount of deviation from a normal distance in a second direction orthogonal to the first direction between a first end nozzle in the first nozzle array and a second end nozzle in the second nozzle array in a state where the first chip and the second chip are appropriately arranged, and
an allocation unit configured to allocate the pieces of print data to the nozzles in the first nozzle array and the second nozzle array based on the inter-nozzle distance, and
the allocation unit performs a shift process of shifting allocation positions of the pieces of print data relative to the nozzles from the allocation positions in a state where the inter-nozzle distance is the normal distance, based on the inter-nozzle distance, and changes a distribution process of distributing the pieces of print data to the nozzles located in the overlapping portion, according to the inter-nozzle distance.

14. An image processing method for performing processing of image data in order to print an image on a print medium with a print head in which a first chip having a first nozzle array and a second chip having a second nozzle array are arranged, by causing the first nozzle array and the second nozzle array to eject a same ink while scanning the print head and the print medium relative to each other in a first direction, the first nozzle array and the second nozzle array each being formed by arraying a plurality of nozzles, the first chip and the second chip being arranged so as to form an overlapping portion where an end region of the first nozzle array and an end region of the second nozzle array overlap each other in view from the first direction, the image processing method comprising:
obtaining pieces of binary print data in which whether to eject the ink or not to eject the ink is defined on a pixel-by-pixel basis based on multivalued input image data;
obtaining an inter-nozzle distance representing an amount of deviation from a normal distance in a second direction orthogonal to the first direction between a first end nozzle in the first nozzle array and a second end nozzle in the second nozzle array in a state where the first chip and the second chip are appropriately arranged; and
allocating the pieces of print data to the nozzles in the first nozzle array and the second nozzle array based on the inter-nozzle distance, wherein
the allocating includes performing a shift process of shifting allocation positions of the pieces of print data relative to the nozzles from the allocation positions in a state where the inter-nozzle distance is the normal distance, based on the inter-nozzle distance, and changing a distribution process of distributing the pieces of print data to the nozzles located in the overlapping portion, according to the inter-nozzle distance.

* * * * *